(12) United States Patent
Saban et al.

(10) Patent No.: US 9,026,036 B2
(45) Date of Patent: May 5, 2015

(54) METHOD AND SYSTEM FOR INTEGRATING AN RF MODULE INTO A DIGITAL NETWORK ACCESS POINT

(75) Inventors: Ofer Saban, Vienna, VA (US); Isaac Shapira, Petach Tikvah (IL); Ami Hazani, Ra'annana (IL); Nissim Atias, Ra'annana (IL); Dror Ben Shlomo, Modiin (IL)

(73) Assignee: Corning Optical Communications Wireless Ltd., Airport (IL)

( * ) Notice: Subject to any disclaimer, the term of this patent is extended or adjusted under 35 U.S.C. 154(b) by 547 days.

(21) Appl. No.: 12/954,110

(22) Filed: Nov. 24, 2010

(65) Prior Publication Data

US 2011/0130163 A1 Jun. 2, 2011

Related U.S. Application Data

(60) Provisional application No. 61/264,427, filed on Nov. 25, 2009, provisional application No. 61/286,726, filed on Dec. 15, 2009.

(51) Int. Cl.
*H04B 3/36* (2006.01)
*H04W 88/08* (2009.01)

(52) U.S. Cl.
CPC .................. *H04W 88/085* (2013.01)

(58) Field of Classification Search
USPC .............................. 455/7–11.1; 709/203–206
See application file for complete search history.

(56) References Cited

U.S. PATENT DOCUMENTS 5,029,965 A 7/1991 Tan
5,339,184 A 8/1994 Tang (Continued)

FOREIGN PATENT DOCUMENTS

EP 0355328 A2 2/1990
EP 0709974 A1 5/1996

(Continued)

OTHER PUBLICATIONS

International Search Report for PCT/US2010/058055 mailed Feb. 10, 2011, 3 pages.

*Primary Examiner* — Fayyaz Alam
(74) *Attorney, Agent, or Firm* — C. Keith Montgomery, Esq.

(57) ABSTRACT

The invention is directed to a method and system for supporting wireless RF services over a wired digital data network infrastructure, such as an Ethernet network. The system includes a control unit that can be connected to a base station that supports one or more wireless RF services. The control unit converts the wireless RF signals to an intermediate frequency (IF) that does not interfere with the data network signals and combines the IF signals onto the cable run to a remote network device on the digital data network. The remote network device includes a multiplexer or a low pass filter and a high pass filter that separates the IF signals from the digital data signals on the downlink and combines the IF signals with digital data signals on the uplink over the cable run. The IF signals can be input to an RF module connected to the remote network device which converts the IF signals back to the original RF signals for transmission by a transceiver to wireless devices. Similarly, on the uplink, RF signals received from the wireless devices through the transceiver can be converted to IF for transmission over the cable run to the base station. In one conventional data network each cable run includes 4 pair of conductors and each pair can be used to carry a different IF frequency band. In addition, each pair can be configured to carry more than one IF frequency band using FDD or TDD. Additional signaling channels, such as for management signaling can be provided using differential signaling between 2 pair of conductors. The filters can be implemented using various technologies, including silicon, LTCC and discrete components and active filters can be provided to allow for configuring and tuning of performance in the field.

15 Claims, 17 Drawing Sheets

(56) References Cited

U.S. PATENT DOCUMENTS

| | | |
|---|---|---|
| 5,436,444 A | 7/1995 | Rawson |
| 5,450,508 A | 9/1995 | Decusatis et al. |
| 5,502,446 A | 3/1996 | Denninger |
| 5,809,395 A | 9/1998 | Hamilton-Piercy et al. |
| 6,049,705 A | 4/2000 | Xue |
| 6,198,432 B1 | 3/2001 | Janky |
| 6,205,266 B1 | 3/2001 | Palen et al. |
| 6,480,651 B1 | 11/2002 | Rabinski |
| 6,577,420 B1 | 6/2003 | Ford et al. |
| 6,676,305 B2 | 1/2004 | Dallas et al. |
| 6,895,249 B2 | 5/2005 | Gaal |
| 6,914,539 B2 | 7/2005 | Hoctor et al. |
| 6,918,269 B2 | 7/2005 | Wang |
| 6,934,511 B1 * | 8/2005 | Lovinggood et al. ........ 455/11.1 |
| 7,023,382 B1 | 4/2006 | Akano |
| 7,123,939 B1 | 10/2006 | Bird et al. |
| 7,443,505 B2 | 10/2008 | Lee et al. |
| 2003/0142926 A1 | 7/2003 | Dallas et al. |
| 2003/0156787 A1 | 8/2003 | King et al. |
| 2004/0100930 A1 | 5/2004 | Shapira et al. |
| 2004/0102196 A1 | 5/2004 | Weckstrom et al. |
| 2005/0053008 A1 | 3/2005 | Griesing et al. |
| 2005/0180700 A1 | 8/2005 | Farr |
| 2006/0056283 A1 | 3/2006 | Anikhindi et al. |
| 2006/0128425 A1 | 6/2006 | Rooyen |
| 2006/0262014 A1 | 11/2006 | Shemesh et al. |
| 2006/0276227 A1 | 12/2006 | Dravida |
| 2007/0264009 A1 | 11/2007 | Sabat, Jr. et al. |
| 2008/0146146 A1 * | 6/2008 | Binder et al. .................. 455/20 |
| 2008/0244148 A1 | 10/2008 | Nix, Jr. et al. |
| 2008/0298481 A1 | 12/2008 | Rofougaran et al. |
| 2009/0323582 A1 * | 12/2009 | Proctor et al. ................ 370/315 |
| 2010/0027940 A1 | 2/2010 | Shapiro |

FOREIGN PATENT DOCUMENTS

| | | |
|---|---|---|
| EP | 0938204 A1 | 8/1999 |
| EP | 1085684 A2 | 3/2001 |
| GB | 2313020 A | 11/1997 |
| JP | 5252559 A | 9/1993 |
| JP | 5327569 A | 12/1993 |
| JP | 5327576 A | 12/1993 |
| JP | 8122587 A | 5/1996 |
| WO | 9613102 A1 | 5/1996 |
| WO | 9804054 A1 | 1/1998 |
| WO | 02091618 A1 | 11/2002 |
| WO | 2004107783 A1 | 12/2004 |
| WO | 2006105185 A2 | 10/2006 |
| WO | 2006136811 A1 | 12/2006 |
| WO | 2007133630 A2 | 11/2007 |

* cited by examiner

FIG. 12A

| Si 1230A | Si 1230B | Si 1230C |
|---|---|---|
| LTCC Layer 1220 | | |
| Laminate Layer 1210 | | |

FIG. 12B

| Si 1230A | Si 1230B | Si 1230C |
|---|---|---|
| LTCC Layer 1220 | | |

FIG. 12C

| LTCC Layer 1220 |
|---|
| Laminate Layer 1210 |

METHOD AND SYSTEM FOR INTEGRATING AN RF MODULE INTO A DIGITAL NETWORK ACCESS POINT

CROSS-REFERENCE TO RELATED APPLICATIONS

This application claims any and all benefits as provided by law of U.S. Provisional Application No. 61/264,427 filed Nov. 25, 2009 and U.S. Provisional Application No. 61/286,726 filed Dec. 15, 2009, both which are hereby incorporated by reference in their entirety.

This application is related to commonly owned U.S. Pat. Nos. 7,587,001, 7,813,451 and U.S. patent application Ser. No. 11/066,442 filed Feb. 28, 2005, Ser. No. 12/129,278 filed May 29, 2008, Ser. No. 12/944,964 filed Nov. 12, 2010, and Ser. No. 12/885,369 filed Sep. 17, 2010, all of which are hereby incorporated by reference in their entirety.

STATEMENT REGARDING FEDERALLY SPONSORED RESEARCH

Not Applicable

REFERENCE TO MICROFICHE APPENDIX

Not Applicable

BACKGROUND

1. Technical Field of the Invention

The invention relates to methods and systems for carrying multiple wireless services using a common distributed antenna system.

2. Description of the Prior Art

Distributed Antenna Systems are used to provide or enhance coverage for wireless services such as Public Safety, Cellular Telephony, Wireless LAN and Medical Telemetry inside buildings and over campuses.

A single DAS can serve a single wireless service (WS) or a combination of many wireless services operating over multiple bands. With respect to medical telemetry services, a medical telemetry system (MTS) access point can be connected to the DAS through the remote wiring closet and using a wireless medical telemetry system (WMTS) module and a service combiner module, the WMTS system can be supported by the DAS using one or more passive antennae.

One desired characteristic of a multi-service DAS is that it can use a single antenna to radiate and receive the signals for all services and frequency bands supported by the DAS. Such an antenna would need to cover (i.e. have acceptable performance) in all frequency bands of interest and is commonly referred to as a Broadband Antenna. An example of a supported frequency range for a DAS antenna would be 400 MHz-6 GHz. To provide MIMO based services, a MIMO antenna which includes multiple antenna elements at a common location can be used.

In referring to the signal flows in DAS systems, the term downlink signal refers to the signal being transmitted by the source transmitter (e.g. cellular base station) through an antenna to the terminals and the term uplink signal refers to the signals being transmitted by the terminals which are received by an antenna and flow to the source receiver. Many wireless services have both an uplink and a downlink, but some have only a downlink (e.g. a mobile video broadcast service) or only an uplink (e.g. certain types of medical telemetry).

SUMMARY

The present invention is directed to a method and system for transferring radio frequency signals over a wired infrastructure used to carry digital data. Digital data networks, such as Ethernet and Token Ring use digital signals to transfer information between terminals. These digital data networks can be both wired and wireless, as well as be formed using a combination of wired and wireless media. A traditional wired digital data network includes network devices connected to switches and routers by wired and wireless links. The wired links can include 2, 4 or 8 conductor cabling, including twisted pair cabling (e.g., CAT 5, CAT 6 and CAT 7 cables). The wireless links can include a wireless access point connected to one end of a wired link.

The wireless access point converts the digital data signals received from the wired network to wireless signals transmitted from the access point to the network device (e.g., a computer, printer or other network device) and wireless digital data signals received from the wireless devices to wired digital data signals. A typical wireless network access point includes a connector for connecting the access point to a wired network and an antenna for communicating with wireless devices. In accordance with one embodiment of the invention, the wired link connecting the wireless access point to the wired network, such as through a hub, switch or router, can also be used to backhaul radio frequency (RF) signals and RF based services between the access point and a base station or similar device (e.g. femto or pico cell) connected to the wired network.

In accordance with one embodiment of the invention, the wireless network access point can include a multiplexer that enables an RF module to be connected between the connector to the wired network and the antenna of wireless network access point. The RF module enables other wireless services to be provided at that location. The multiplexer enable RF wireless service signals received from the wired network to be communicated through the RF module to wireless devices and RF signals received by the RF module to be communicated through the multiplexer to the wired network. This enables the wired network serve as a backhaul communication facility for the RF wireless devices and services separate and apart from the digital data network.

The RF signals can be carried over the digital data network using a different frequency (an intermediate frequency, IF) band than the radio frequency used to transfer the signals between the RF module and wireless devices designed to communicate over the predefined RF band. The IF band can be selected to minimize interference with other signals carried on the cable and to provide optimal signal quality and performance over the cable. Multiple IF bands can be used to transfer multiple RF signals and services over each conductor or conductor pair of the cable. These wireless devices can include medical telemetry devices, cellular and mobile telephones, smart phones and PDAs.

Where the wired network infrastructure includes multiple conductor cabling (2, 4 and 8 wire twisted pair), the multiplexer can include a balanced (differential) diplexer for each pair of conductors. Each pair of wires can carry one or more IF band signals using the same or different and non-interfering frequency bands, where each frequency band is different and non-interfering with respect to the frequency bands used to carry data over the digital data network (e.g., the one or more baseband frequencies). Time division multiplexing (TDM) or time division duplexing (TDD) can be used to carry more than one IF band signal using the same frequency band and frequency division duplexing FDD can be used to carry more than one IF band signal using the different frequency bands.

In addition, two (or more) pair of wires can be used to carry additional IF signals, for example, using differential signaling between the wire pairs. These additional IF signals can be used to communicate data, management, control, power and timing signals between the access point or RF module and a controller device connected to the digital data network. Further, more than one IF signal can be carried over the two (or more) pair of wires using TDD or FDD.

The multiplexer can include passive components, active components or a combination of passive and active components. In one embodiment, the multiplexer can include one or more diplexers including one or more elliptically balanced low pass and high pass filters. The low pass filters can be used to separate the digital data signals communicated between the digital data devices (e.g. Ethernet) and the high pass filters can be used to separate the IF signals (carrying RF signals) communicated between the RF components of the system (e.g. analog modules, base stations, femto cells, pico cells, etc.).

In accordance with invention, a wired data network can be used to extend or distribute RF based wireless services. The antenna unit for these RF wireless services can be connected through or integrated with the wired data network device or access point.

These and other capabilities of the invention, along with the invention itself, will be more fully understood after a review of the following figures, detailed description, and claims.

BRIEF DESCRIPTION OF THE FIGURES

FIGS. 11 and 12A-C show diagrammatic views of the layout and construction of filters according to the invention.

DETAILED DESCRIPTION OF PREFERRED EMBODIMENTS

The present invention is directed to a method and system that uses an existing digital data network infrastructure to carry other signals, in addition to the digital data signals. The digital data network infrastructure includes wires and devices that communicate by transmitting and receiving signals at predefined frequencies for transferring data. In accordance with the invention, further devices can be connected to the network infrastructure to transfer additional signals in order to support other communication services including voice and data services. These other communication services (also referred to as RF based services) can, for example, include wireless services such as cellular telephony (cellular, pcs, 3G), medical telemetry and global positioning system (GPS).

Figure 1:
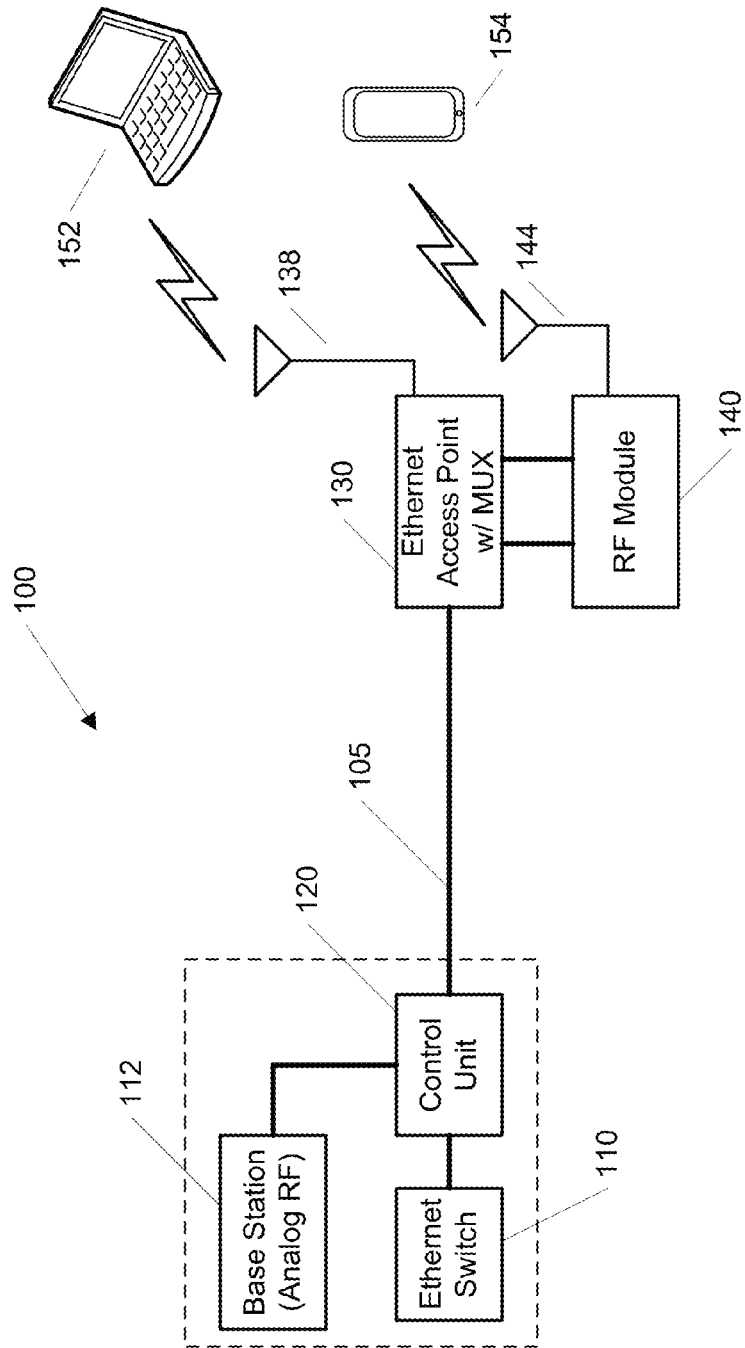
FIG. 1 is a block diagram of a system according to the invention.

FIG. 1 shows a system 100 in accordance with one embodiment of the invention. The system 100 can include a network switch 110, a base station 112, a control unit 120, a cable run 105, a network access point 130 and an RF module 140. The network switch 110 can be any network device that connects the network access point 130 to other network devices or other networks, such as an Ethernet switch or hub. In alternative embodiments, any network device including, for example, a network switch, hub or router, an IP phone, a femtocell, a computer or an IP camera can be used in the place of network access point 130. In this example, the network switch 110 (an Ethernet switch) can be connected to the network access point 130 (an Ethernet access point) through the control unit 120. The control unit 120 can also be connected to the base station 112. The RF module 140 can be connected to the network access point 130 using a multiplexer as described herein. The base station 112 can be a cellular repeater, bi-directional amplifier (BDA), femtocell, picocell, or microcell base station or any combination thereof. The network access point 130 can include an internal or external antenna and can be used to transfer wireless signals with a remote wireless network device 152, such as a computer, a smart phone, a terminal, a piece of networked equipment such a printer, or a network repeater. The RF module 140 can include an internal or external antenna 138 and can be used to transfer RF wireless signals with a remote wireless device 154, such as a cellular/pcs/3G telephone, smart phone or a cellular/pcs/3G networked device, medical equipment and global positioning systems, or GPS enabled devices.

In accordance with the invention, the control unit 120 receives data network signals from the network switch 110 and radio frequency (RF) signals from the base station 112. The control unit 120 converts the RF signals received from base station 112 to intermediate frequency (IF) signals for transmission over the cable run 105 and the IF signals back to the appropriate RF signals for transmission to the base station 112. The frequency of the IF signal can be predefined or dynamically selected to be any frequency that does not substantially interfere with other signals transferred over the cable run 105. The control unit 120 can also include signal splitting and combining components or circuitry which can combine the IF signals and the digital data network signals onto the cable run 105 and split the IF signals and the digital data network signals coming from the cable run 105. In one embodiment, the control unit 120 includes a multiplexer or a diplexer to combine the signals to be transmitted over the cable run 105 on the downlink and separate the signals received from the cable run 105 on the uplink. In accordance with one embodiment of the invention, the cable run 105 can be connected at the remote end to a network device such as a network access point 130 (or a switch, hub or router, not shown). The network access point 130 can include or be connected to an RF module 140. In accordance with one embodiment of the invention, the cable run 105 can be CAT 5 or better cable which includes multiple twisted pair conductors. For example, CAT 5 cable can include 8 conductors arranged as 4 twisted pairs. In an alternative embodiment, the base station 112, network switch 110 and control unit 120 can be combined into one device that provides the functionality of all three. Alternatively any two of the devices can be combined, the base station 112 and control unit 120, the network switch 110 and control unit 120 or the network switch 110 and base station 112 can be combined. In an alternative embodiment, the network device (e.g. network access point 130 can include a bypass (for example, a switch or jumper, not shown) that allows digital data network signals to bypass the multiplexer if no RF module 140 is present in the system.

Figure 2:
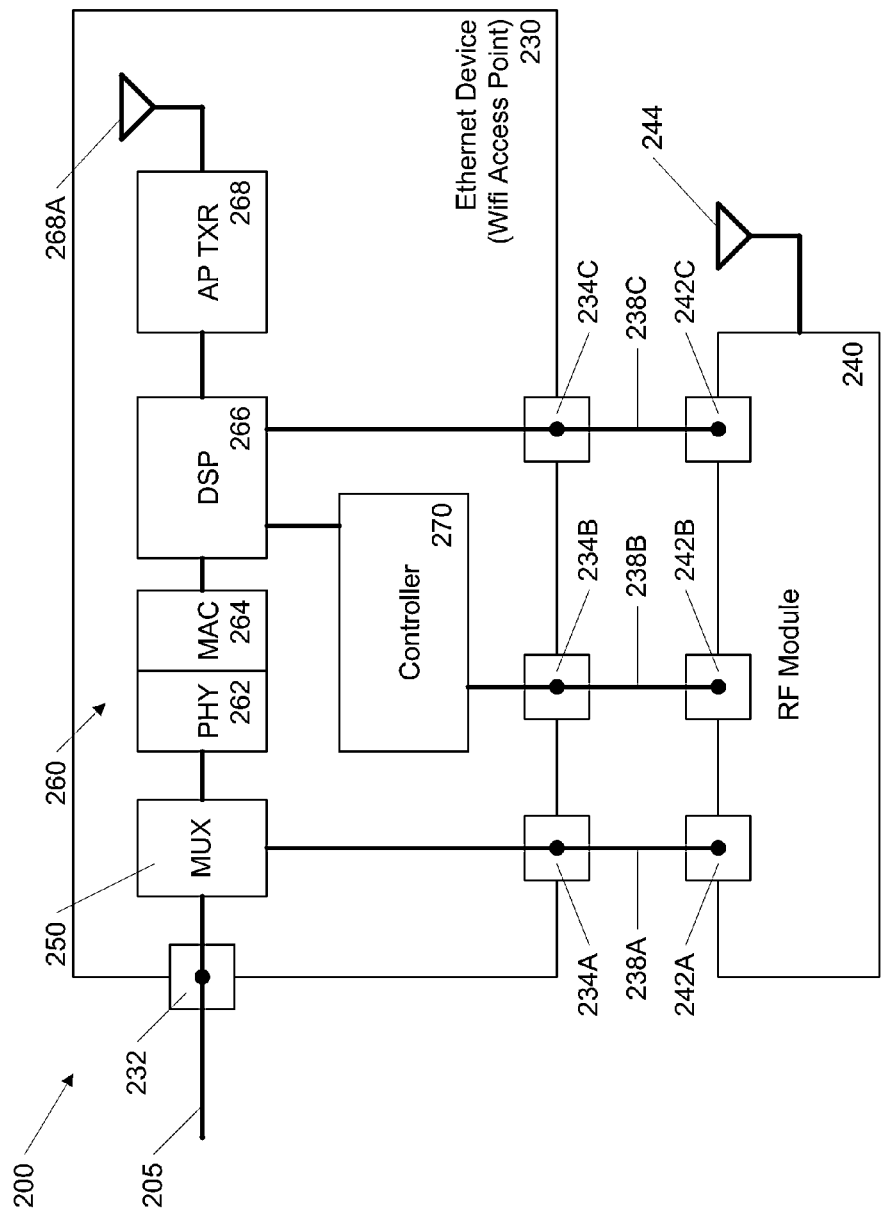
FIG. 2 is a block diagram of an access point and an RF module according to the invention shown in FIG. 1.

FIG. 2 shows a network access point 230 and RF module 240 in accordance with one embodiment of the invention. The network access point 230 can include a connector 232, a multiplexer 250, a physical layer interface (PHY) 262, a media access controller (MAC) 264. a signal processor (DSP) 266, and an access point wireless transceiver (AP TXP) 268 providing IQ to RF conversion. The connector 232 can be, for example an RJ45 connector that mates an appropriate connector on the end of the cable run 205. In accordance with the invention, the network access point 230 can include a component or group of components, such as multiplexer 250 that can separate the digital data signals and the IF signals received from the cable run 205 and combine the digital data signals and IF signals for transmission over the cable run 205. In accordance with one embodiment of the invention, the multiplexer 250 can include one or more diplexers. In addition, the network access point 230 can include well known digital data network interface and processing components 260 (including elements 262 and 264) adapted to receive/send and process the digital data network signals. For example, in one embodiment, the network access point 230 can be a wireless Ethernet (WiFi) access point. The access point 230 can include an Ethernet transformer with or without a common mode choke (shown in FIGS. 3, 4, 13, 14), an Ethernet physical layer interface (PHY 262), an Ethernet media access controller (MAC 264), a signal processor (DSP 266), and an access point wireless transceiver (converting between IQ signals and RF signals) 268 and one or more antenna(s) 268A for transmitting and receiving wireless digital data according to proprietary or well known standards such as IEEE 802.11 or WiFi. The DSP 266 can be connected directly using a connection 234C, a link 238C, and a connection 242C or indirectly, thru the controller 270, via connection 234B to the RF module 240, for example, using a bi-directional analog or digital link 238C. The link 238C can support additional functionality, for example, RF module listening mode, Pilot beacon mode for location and signaling to the handset of operational frequencies. Narrow band RF samples can be extracted from the IP traffic to provide additional narrow band services, for example, IDEN, two way radio, medical telemetry, and a PILOT control signal that can be used in macro networks.

The network access point 230 can also include a controller 270 for controlling the operation of the network access point 230 and any or all the components 260 of the network access point 230. In addition, the controller 270 can communicate with and, optionally, control some or all the operations of the RF module 240 using communication channel 238B or 238C.

The RF module 240 can include a connector 242 for connecting with connector 234 of the network access point 230 and communication channels 238 to transfer data between the network access point 230 and the RF module 240. For illustrative purposes, FIG. 2 shows three separate sets of connectors (234A-234C and 242A-242C) and communication channels 238A-238C), however a single, multi-conductor connector can be used. The network access point 230 can be any network device and does not need to be an access point. In other embodiments of the invention, a network device, such as a hub, switch or router, or a computer terminal or network attached printer can be substituted for network access point 230.

In one embodiment, the RF module 240 can include a component that includes or generates one or more access keys that can be used control the use of the RF module 240 and the RF based services provided by the RF module 240. The access point 230 can communicate with the RF module 240 to request one or more access keys from the component in RF module 240. The access point 230 can validate the access key(s) to verify that the RF module is compatible with the access point 230 as well determine which services (e.g., cellular, pcs, 3G, etc.) are authorized to be used on the access point 240. For example, an access point 230 can be authorized for use with only a 3G network, even though the RF module can support additional services, such as cellular and pcs. In addition, the access point 230, in some embodiments can be powered by power supplied by a connected switch or control unit and can measure the available power from the switch or control unit and limit the levels of service authorized based on the available power received at the access point.

In accordance with invention, the RF module 240 can optionally include noise suppression circuitry, frequency conversion components and a transceiver. The noise suppression circuits can be used to suppress cross-talk, low frequency noise and common mode noise. The frequency conversion components, can include for example, mixers that convert, on the downlink, the IF signals back to RF signals to be transmitted by the transceiver through the antenna to the wireless devices and convert on the uplink, the RF signals received by the transceiver through the antenna to IF signals for transmission to the base station.

In accordance with the invention, the RF module 240 can include active and/or passive noise suppression circuitry. In accordance with one embodiment of the invention, on the downlink, the control unit can receive from the access point, either a command signal or a noise cancelation signal determined from the noise measured by the access point and, using a fixed or variable gain, combine the noise cancellation signal with the downlink signal to suppress noise. Similarly, on the uplink, the control unit can receive from the access point, either a command signal or a noise cancelation signal determined from the noise measured by the access point and, using a fixed or variable gain, combine the noise cancellation signal with the uplink signal to suppress noise. In some embodiments, the source of the noise will primarily be from cross-talk between cables carrying different services. In accordance with on embodiment, the control unit can communicate with an adjacent control unit to obtain the noise signal and communicate with the access point to determine the appropriate level of gain or attenuation needed to suppress the noise separately on both the uplink and the downlink.

The network access point 230 can include a controller 270, such as a microprocessor and associated memory (including volatile and non-volatile). The memory can include software or firmware that programs and instructions that define the operation of the network access point 230. The programs and instructions and the operation of the network access point 230 can be user configurable. The network access point controller 270 can communicate with an RF module controller (not shown) via communication channel 238 to enable the network access point controller 270 monitor and/or control the RF module 240. Alternatively, the RF module controller can control the network access point 230.

Figure 3:
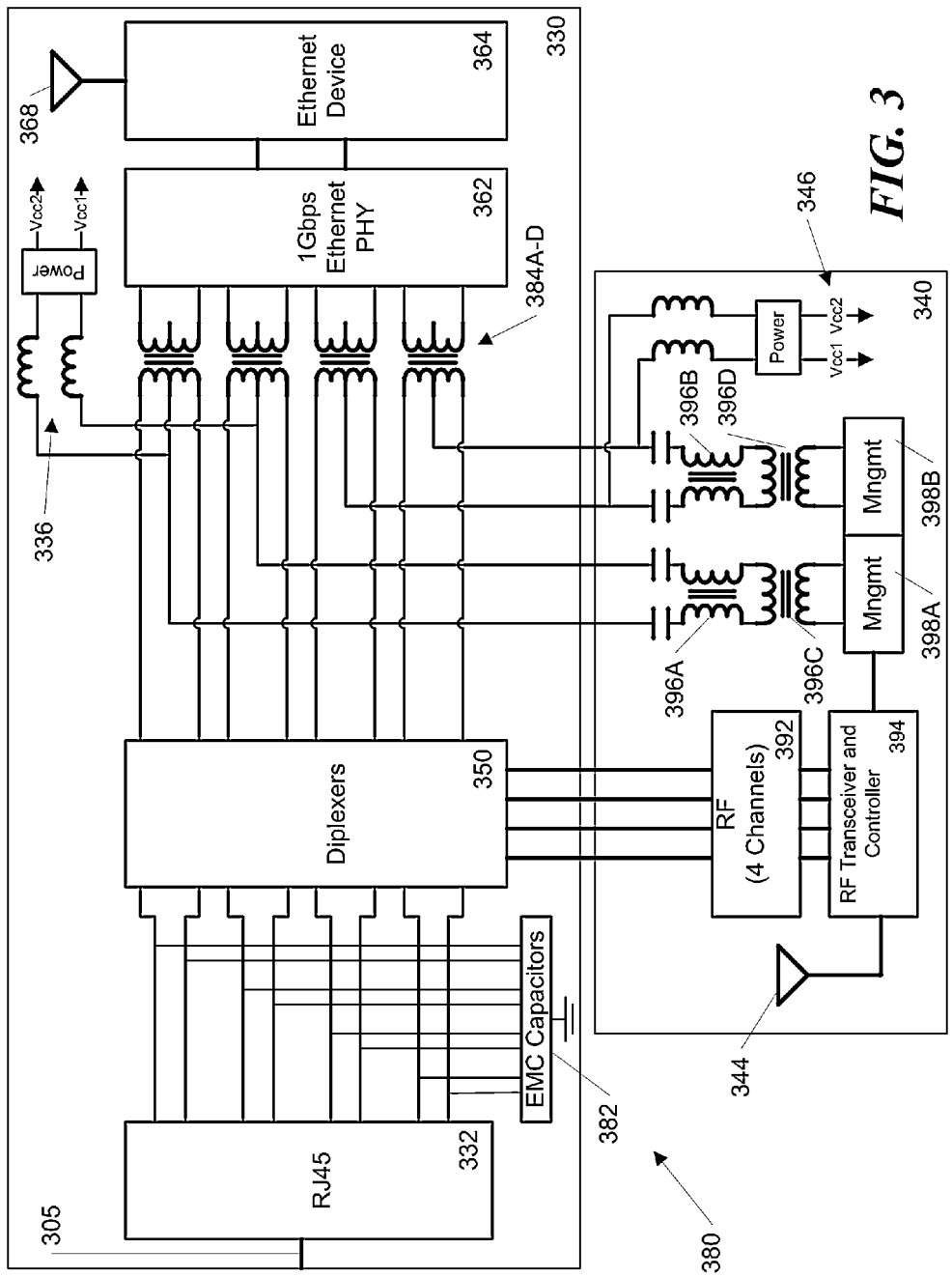
FIG. 3 is a diagrammatic view of the combination of an Ethernet device and RF module according to one embodiment of the invention.

FIG. 3 shows one embodiment of the invention in more detail. The network access point 330 can include a connector 332, such as an RJ 45 connector, connecting 4 twisted-pair conductors of the cable run 305 to diplexer block 350. The diplexer block 350 can include one or more diplexers, for example, one diplexer for each twisted pair of conductors, for a total of four. Each twisted pair of the cable run 305 can provide one or more (using the same IF signal bands in TDD mode or different IF signal bands in FDD mode) channels to transfer RF signals associated with one or more wireless services as well as support MIMO and spread spectrum based wireless technologies. Each diplexer can include a low pass filter to separate the digital data signals and a high pass filter to separate the RF signals on the downlink and combine the digital data signals and RF signals onto a twisted pair on the uplink.

In accordance with one embodiment of the invention, the wireless data network can use the 125 MHz frequency band to transfer digital data over the cable run 305 and the control unit 120 can use frequency bands at 130 MHz and above for IF signals to support other wireless services. Depending on the quality of the cable used in the cable run 305 and the environment, IF signals up to 1 GHz can be transferred over the cable run 305. In one embodiment, there can be 4 pair of conductors and each pair can, for example, carry one of the following IF bands, 140 MHz, 165 MHz, 200 MHz and 242 MHz. Alternatively, each pair of conductors could use the same IF band, for example, 180 MHz and two channels can be used for the uplink and two channels can be used for the downlink. Network access point 330 can include noise suppression components 380, including EMC capacitors 382 and 1 Gbps Ethernet transformers 384A-D. In this embodiment, the 1 Gbps Ethernet transformers 384A-D do not include a common mode choke for reducing common mode noise.

The diplexer block 350 can include one or more diplexers for each conductor pair that separate the Ethernet digital data signals to connect them the 1 Gbps Ethernet transformers 384A-D and the IF signals to connect them to the RF module 340. In the illustrative embodiment, there are four communication channels corresponding to the four twisted pair connections and each channel can be serviced by a diplexer that separates the digital data signals and IF signals on the downlink and combines the digital data signals and IF signals on the uplink.

In addition to the four communication channels, additional data signals can be transferred on other frequency bands using two (or more) of twisted pair conductors and differential signaling techniques over the two (or more) pair of conductors. In this embodiment of the invention, 1 GHz Ethernet transformers 384A-D can be configured with the center taps of two transformers, capacitively coupled to transformers 396A and 396B to extract additional data signals sent over the cable run 305 by control unit 120 or another device. Transformers 396C and 396D can be provided for noise suppression and signal conditioning. These signals can be management signals, used to control all or part of the operation of the RF module 340. The management signals can include TDD and FDD signals, ASK signals, Ethernet baseband signals, timing signals (reference clock and SYNC synchronization signals), control signals (SPI, I2C, UART), heart beat signals, and power signals. Power signals (for example, Power over Ethernet signals) 336 and 346 can be provided as well, with one Power over Ethernet signal 336 used to power the Ethernet access point 330 and one Power over Ethernet signal 346 used to power the RF module 340. Preferably, these power and management signals can be communicated using bands in the 0-30 MHz frequency range, although higher frequency bands can be used. For example, the two management signals can be transferred using the 5.5 MHz and 10 MHz IF bands. In this configuration, the 1 GHz Ethernet transformers 384A-D can be configured without a common mode choke which could suppress these signals.

The Diplexer 350 can split the signals on each wire pair received by access point 330, feeding the IF signals to the RF module 340. The RF module 340 can include a control and transceiver unit 394 for controlling the operation of the RF module 340 and transmitting and receiving RF signals. In some embodiments of the invention, the control portion of the control and transceiver unit 394 can be omitted. In operation, signals received from the network can be up-converted (from IF to RF) and transmitted using antenna 344 and RF signals received by antenna 344 can be down-converted (from RF to IF) and transmitted to the network. The control and transceiver unit 394 can also include an up-down converter for converting the IF signals to RF signals on the downlink and the RF signals to IF signals on the uplink.

Figure 4:
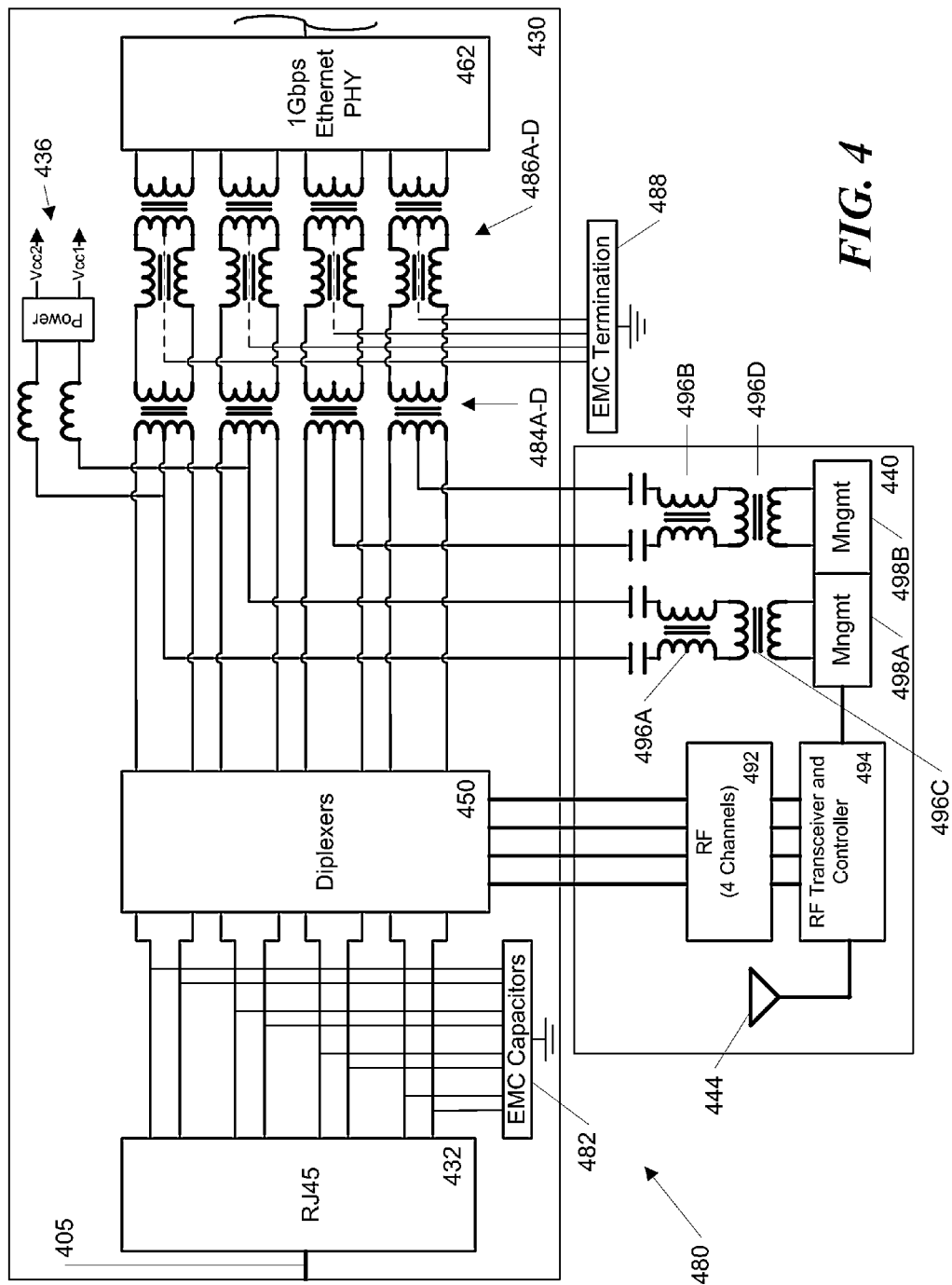
FIG. 4 is a diagrammatic view of the combination of an Ethernet device and RF module according to an alternate embodiment of the invention.

FIG. 4 shows an alternate embodiment of the invention similar to FIG. 3. The primary difference is that FIG. 4 includes additional noise suppression using 1 Gbps Ethernet transformers 486A-D configured to include a common choke after the 1 Gbps Ethernet transformers 484A-D. In this configuration, the second set of 1 Gbps Ethernet transformers 486A-D provide additional noise suppression, after the management signals have been extracted from the incoming signals. In FIG. 4, the power signals, not shown, used to power the module 440 can be the same as shown in FIG. 3, power section 346. The RF module 440 can include an optional controller and transceiver unit 494 for controlling the operation of the RF module 440. The controller and transceiver unit 494 can also include an up-down converter for converting the IF signals to RF signals on the downlink and the RF signals to IF signals on the uplink.

The Diplexer 450 can split the signals on each wire pair received by access point 430, feeding the IF signals to the RF module 440. The RF module 440 can include a control and transceiver unit 494 for controlling the operation of the RF module 440 and transmitting and receiving RF signals. In some embodiments of the invention, the control portion of the control and transceiver unit 494 can be omitted. In operation, signals received from the network can be up-converted (from IF to RF) and transmitted using antenna 444 and RF signals received by antenna 444 can be down-converted (from RF to IF) and transmitted to the network. The control and transceiver unit 494 can also include an up-down converter for converting the IF signals to RF signals on the downlink and the RF signals to IF signals on the uplink.

Figure 5:
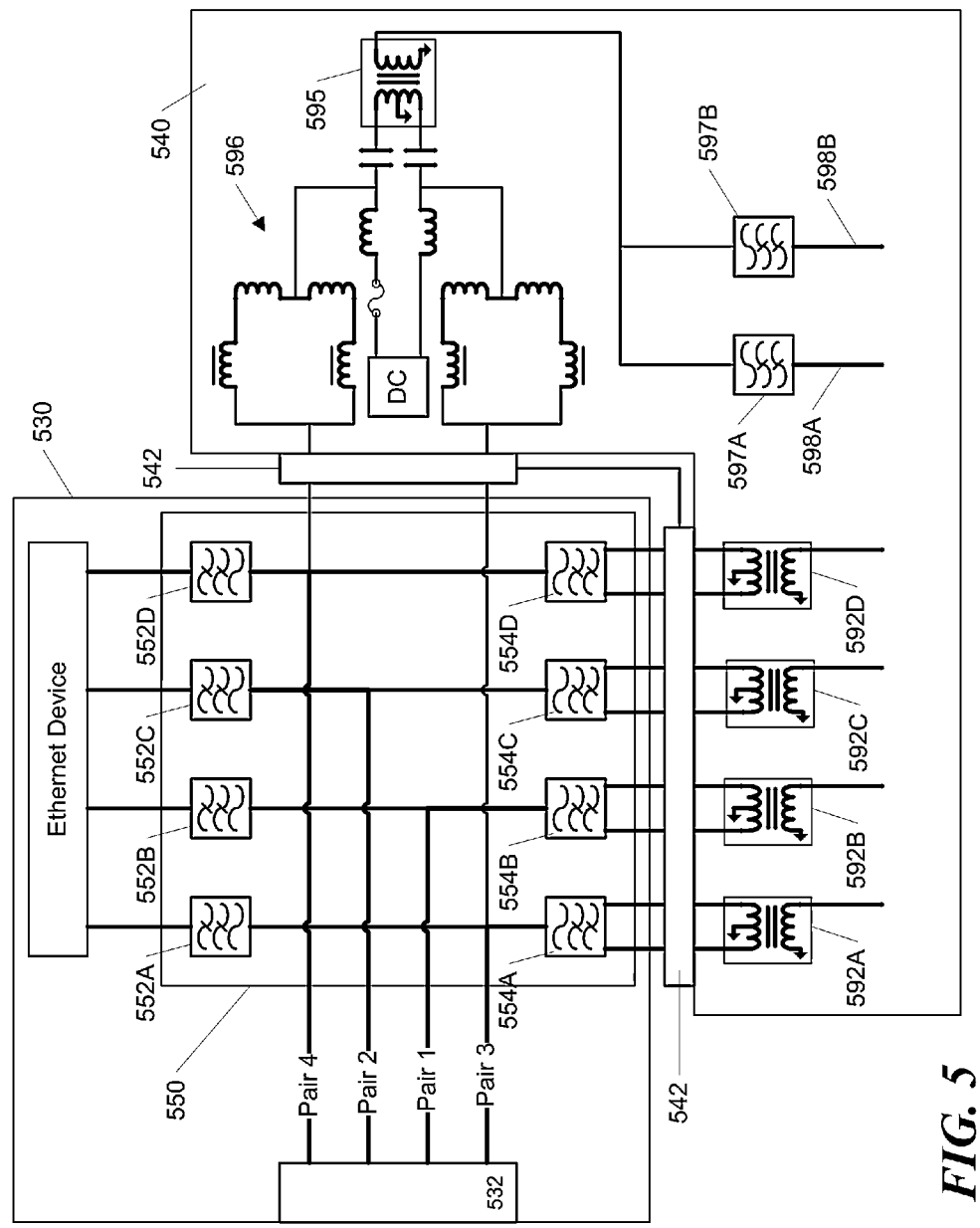
FIG. 5 is a diagrammatic view of an Ethernet device and a connected device according to one embodiment of the invention.

FIG. 5 shows a diagram of one embodiment of the invention showing each of the diplexer blocks 550 constructed using a low pass filter 552A-D and a high pass filter 554A-D. In this embodiment, the module 540 can be connected to the Ethernet access point 530 through connector 542. As shown in FIG. 5, optional baluns 592A-D can be provided to convert the balanced/differential signals received from the diplexer block 550 to unbalanced signals. The baluns 592A-D can be omitted to provide differential isolation and improved isolation between unshielded cables to support multiple IF bands on the same physical twisted pair cable, such as to support 4 channel MIMO technology. In accordance with this embodiment, multiple RF signals can be carried on the same IF band using TDD and/or multiple IF bands using FDD. In an alternative embodiment, active common mode noise suppressing circuits can be used to improve common mode noise rejection and improve performance of the system.

FIG. 5 also shows a system for providing management signals 598A and 598B using differential signaling between 2 pair of twisted pair cables (Pair 3 and Pair 4). In this embodiment, an inductor network 596 which can include, for example, ferrite bead inductors capacitively coupled to balun 595 to suppress the high frequency noise and pass the low frequency (0-30 MHz) management signals. Filters 597A and 597B can be used extract the specific management signal frequency. Filters 597A and 597B can be high pass filters, band pass filters and low pass filters, depending on the signal frequencies used for the management signals. In one embodiment, the management signals can be transferred on the 5.5 MHz and 10 MHz frequency bands.

Figure 6:
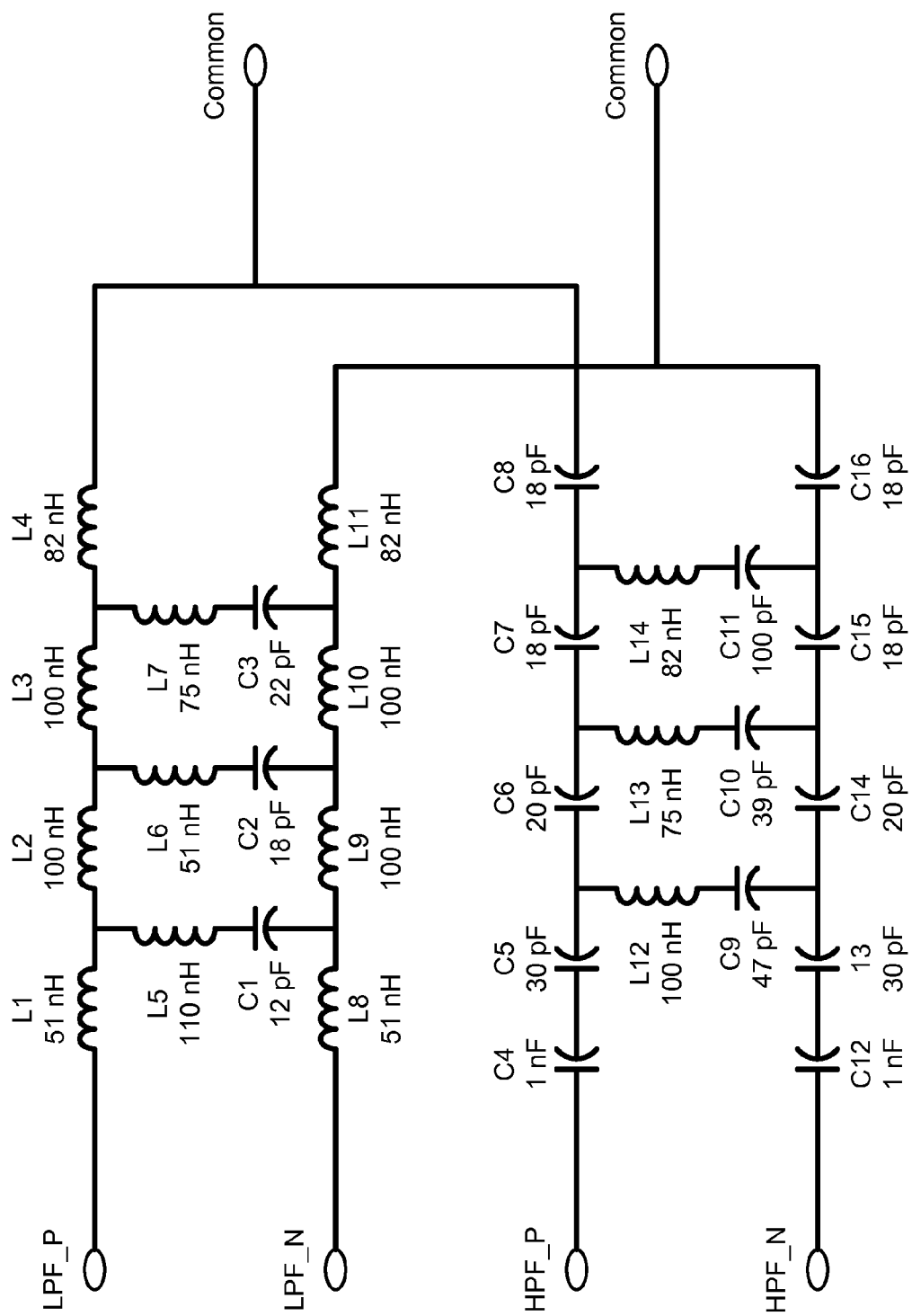
FIG. 6 is a schematic diagram of a diplexer according to one embodiment of the invention.

FIG. 6 shows a schematic diagram of a single diplexer in accordance with an embodiment of the present invention. In this embodiment of the invention, the diplexer includes a high pass section and a low pass section formed using passive components including capacitors and inductors. In alternative embodiments, active components or a combination of active and passive components can be used.

In accordance with one embodiment of the invention, the multiplexer 250 and the diplexer 350, 450, 550, can include a bypass circuit that directly connects the Ethernet transformers to the input connector 232, 332,432,532, bypassing the multiplexer 250 and the diplexer 350, 450, 550 completely. In this configuration, when an RF module is not connected to the system, the bypass can be engaged to avoid noise injected by the multiplexer 250 and the diplexer 350, 450, 550 components and the connector used to connect the RF module to the system. The bypass can be implements using a switch or a jumper which directly connects the input connector 232, 332, 432,532 to the Ethernet transforms and the PHY. Alternatively, the bypass can be implemented using active components and activated through software controls. In addition or alternatively, the connector 242, 542 can be terminated using a common mode choke transformer to suppress unwanted emissions and interference.

Figure 7:
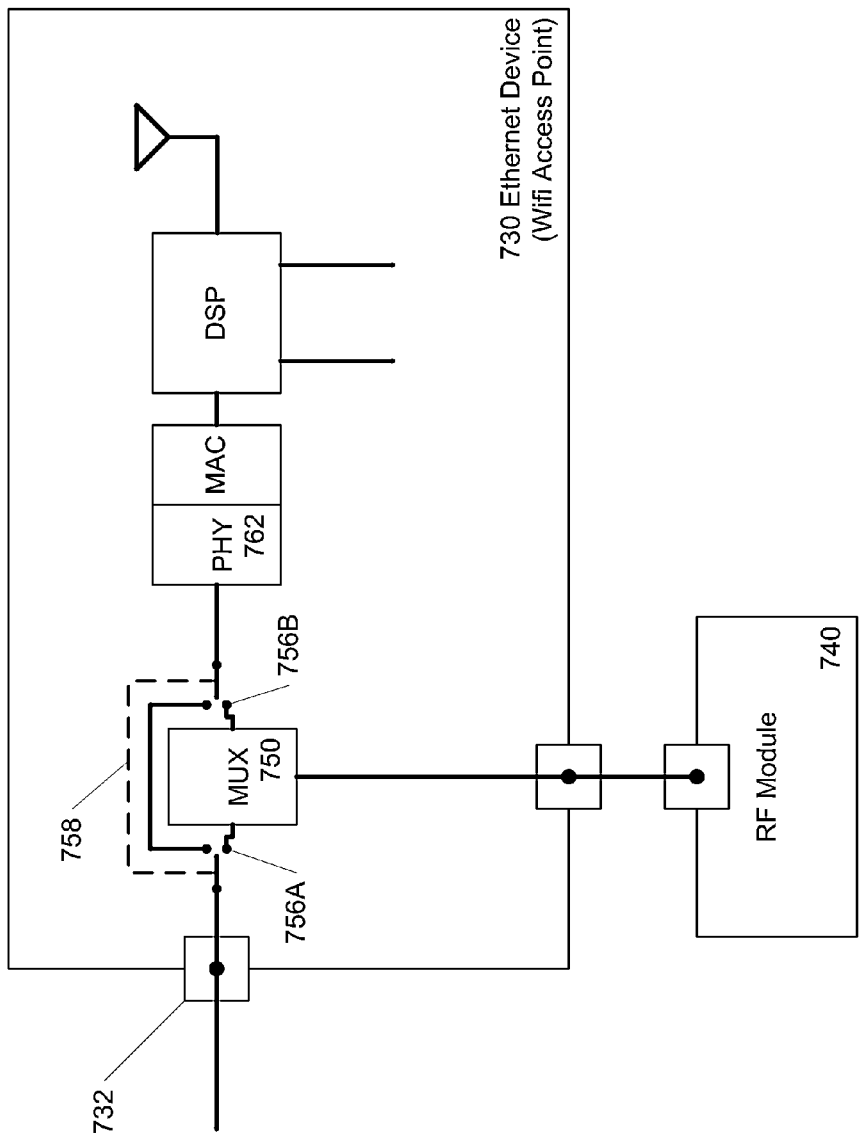
FIGS. 7-9 show diagrammatic views of alternative embodiments of the invention.

FIG. 7 shows a diagrammatic view of an alternative embodiment of the invention. The Ethernet device 730 can include one or more by-pass switches 756A, 756B that allow the multiplexer or diplexer 750 to be by-passes. As shown in FIG. 7, the by-pass switch 756A-B can be a double pole, double throw switch, where one position connects the multiplexer or diplexer 750 to the PHY 762 and connector 732 and the other connects the PHY 762 and connector 732 by one or more conductors. In an alternative embodiment, one the by-pass switches 756B can be omitted. In an alternative embodiment, a jumper 758 can be removeably connected between the PHY 762 and connector 732, by-passing the multiplexer or diplexer 750. In alternative embodiment of the invention, one or both switches 756A-B can be electronic or solid-state switches that can be controlled manually (such as by a mechanical switch) or controlled by software.

Figure 8:
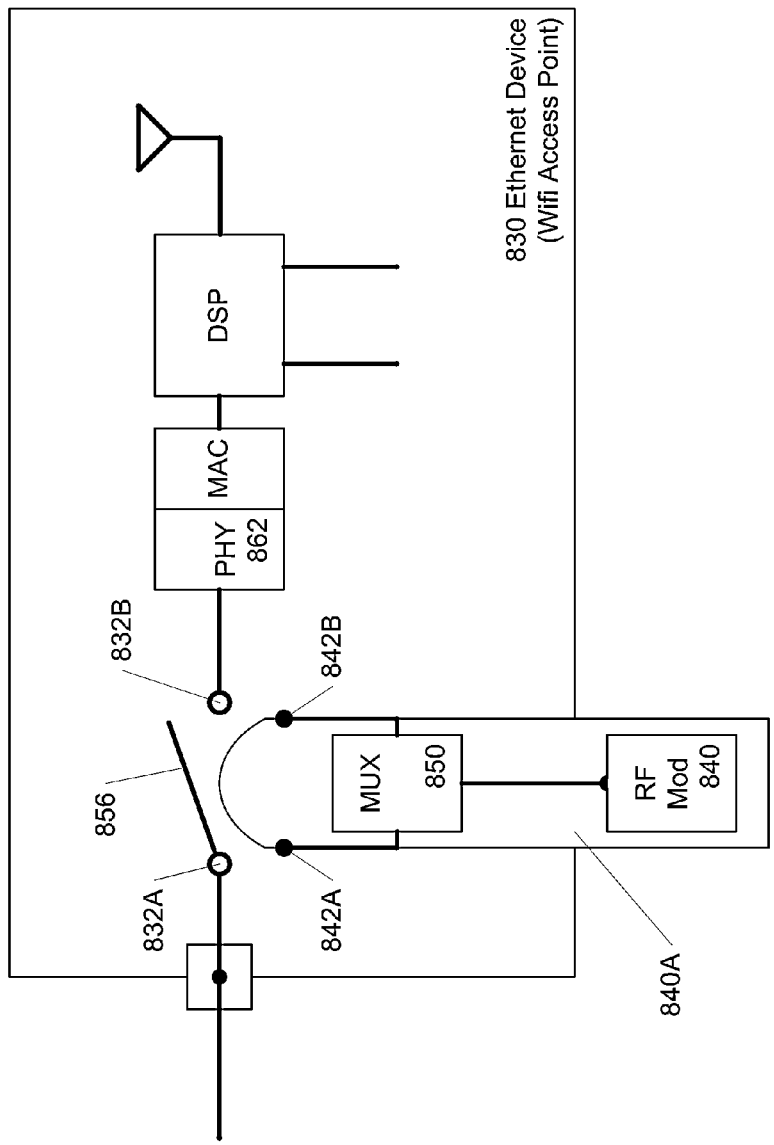

FIG. 8 shows an alternative embodiment of the invention, where the RF module 840 and multiplexer or diplexer 850 reside on a single plug-in component 840A. The plug-in component 840A can include contacts 842A and 842B that make contact with contacts 834A and 834B when the plug-in component 840A is plugged into the Ethernet device 830 and at same time causing switch 856 to open, breaking the connection between the PHY 862 and connector 832.

Figure 9:
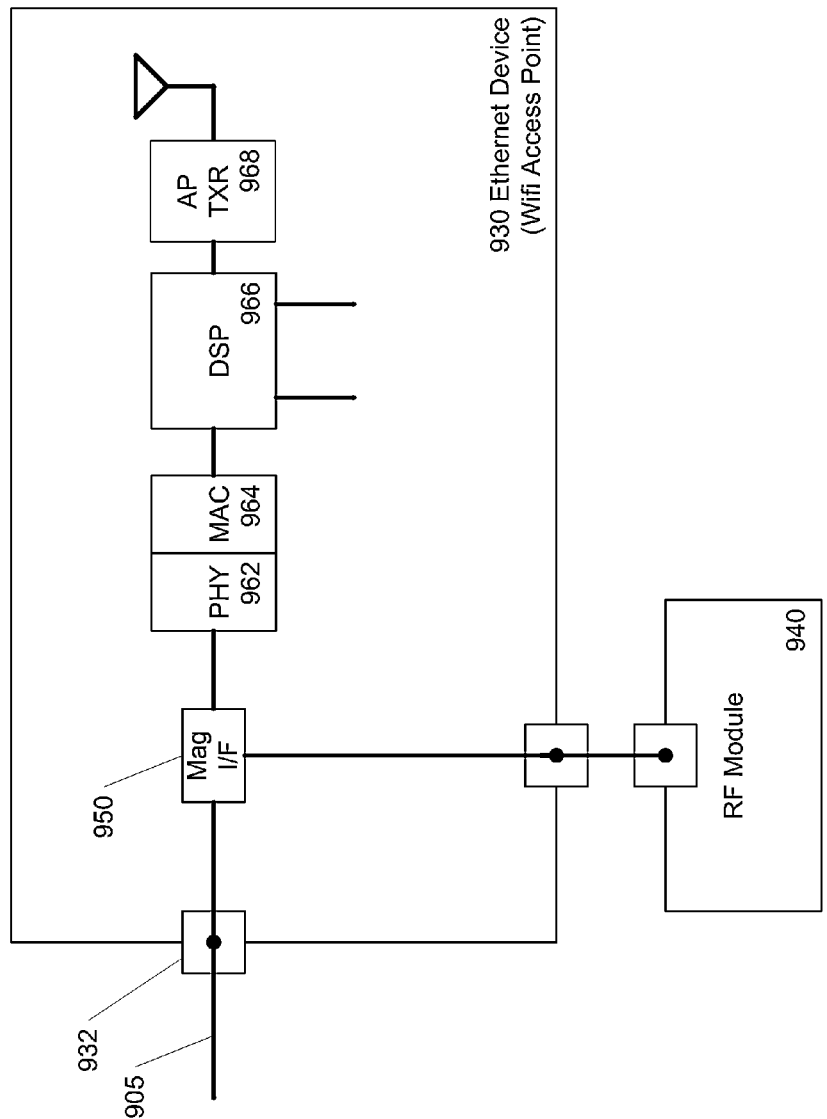

FIG. 9 shows an alternative embodiment of the invention, wherein the multiplexer or diplexer is replaced by a magnetic or inductive coupling 950 that couples the IF band signals onto each Ethernet pair, allowing the RF signals on IF band to be inserted and extracted from the Ethernet cabling 905. The coupling 950 can include a transformer designed or tuned to output the RF signals to the RF module 940.

Figure 10:
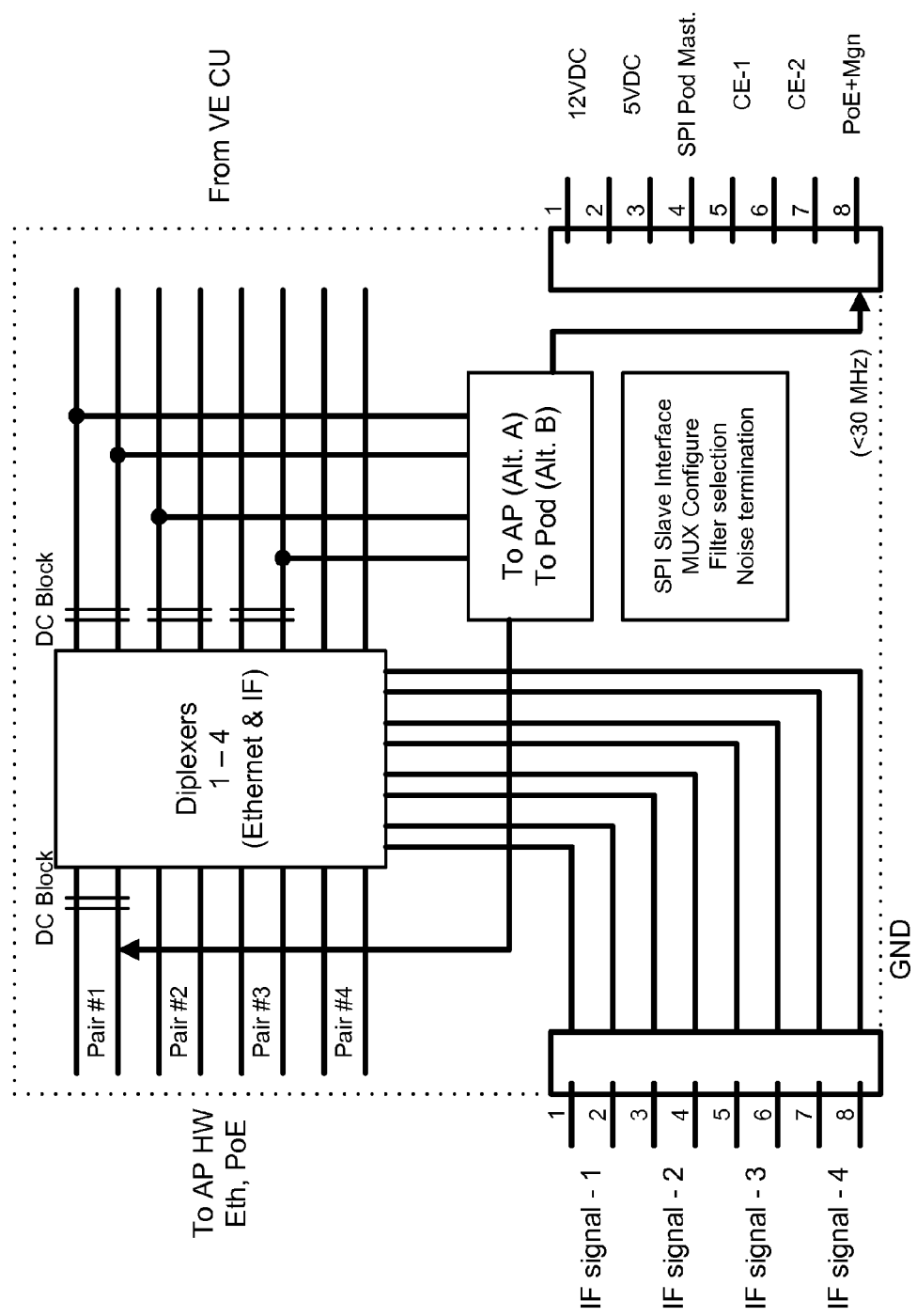
FIG. 10 shows a diagrammatic view of an alternative embodiment of the invention wherein the Diplexer is an integrated component that can be the front end of an access point.

FIG. 10 shows an alternative embodiment of the invention wherein the Diplexer is an integrated component that can be the front end of an access point. The integrated component can use one or more integration technologies (integrated circuits, such as silicon based ICs, low temperature cofired ceramics, and traditional laminate pcbs) to reduce the size of the component so that it can fit inside a traditional access point or be inserted, in similar fashion to a PC card, or SD, mini SD or Micro SD flash memory card. As shown, the access point can provide 5V and/or 12V power, an SPI Master signal line, a CE 1 (comp. enable), a CE 2 (comp. enable), and Power over Ethernet (PoE) management signal line. These signals can be used to carry power and control signals between the access point and the RF module.

Figure 11:
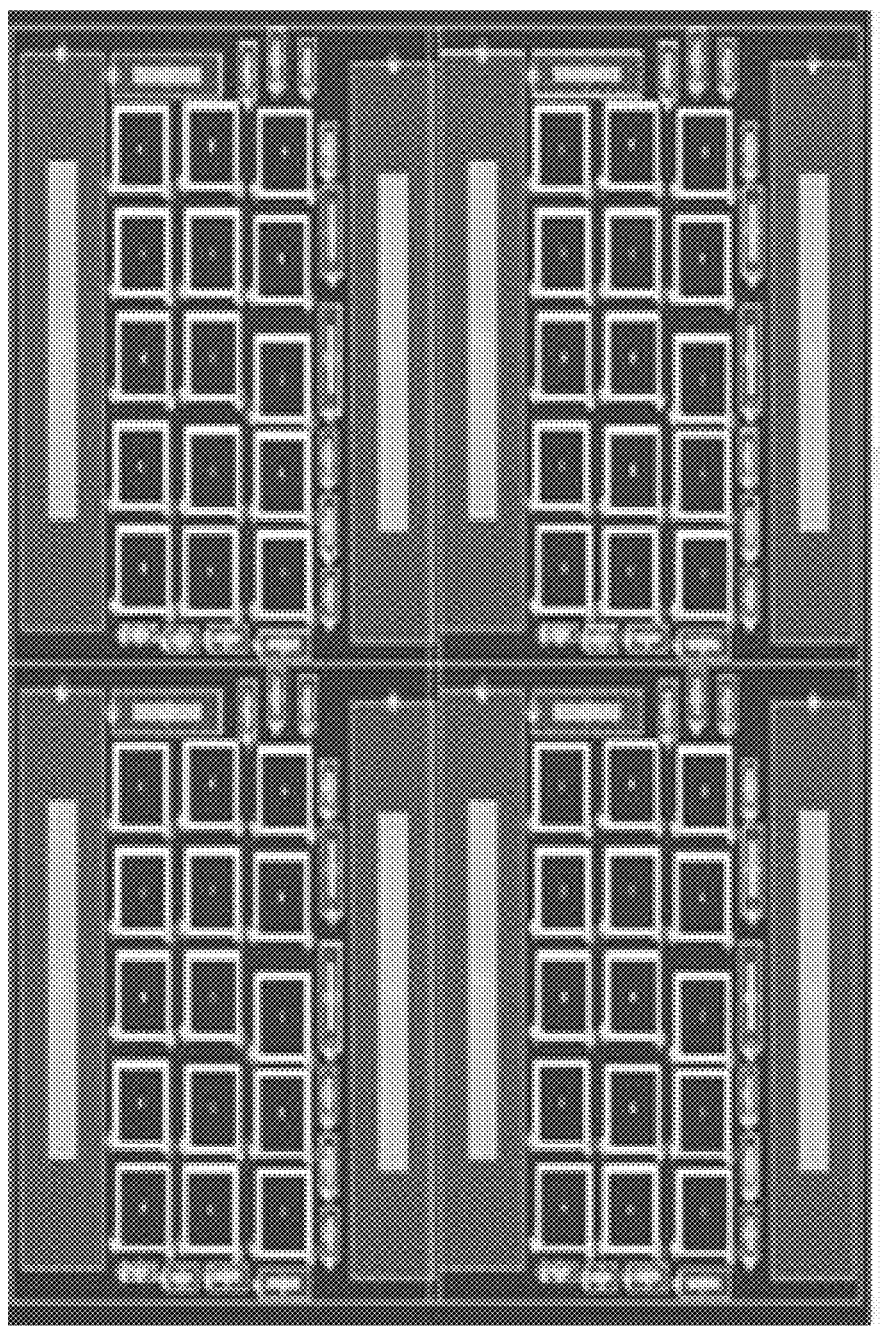

FIG. 11 shows a diagram of the layout of the multiplexer or diplexer filters. The filters can implemented as a silicon based integrated circuit, using passive, active or a combination of passive or active components. Alternatively, the filters can be implemented using a combination of silicon based components and low temperature cofired ceramic (LTCC) based components. For example, the capacitors can be implemented on LTCC and the inductor implemented in silicon to reduce the parasitic effects of the silicon on the capacitors and improve performance and yield. Alternatively, the filters can be implemented using a multiple technologies, including laminate substrate, LTCC and silicon integrated circuit. For example, the large inductors can be mounted on the laminate substrate, the small inductors and large capacitors that are less sensitive to parasitic effects, can be implemented on silicon and the small capacitors can be implements on LTCC.

FIGS. 12A-12C show diagrammatic cross-sectional views of the multiplexer or duplexer filters of FIG. 10. Each shows alternative embodiments using different integration technologies.

FIG. 12A shows three layers, a laminate layer 1210, an LTCC layer 1220 and multiple Silicon layers 1230A-1230C. In this embodiment, for example, the laminate layer 1210 can include large inductors, the LTCC layer 1220 can include capacitors and inductors and the Silicon layers 1230A-1230C can include inductors.

FIG. 12B shows two layers, an LTCC layer 1220 and multiple Silicon layers 1230A-1230C. In this embodiment, for example, the LTCC layer 1220 can include capacitors and large inductors and the Silicon layers 1230A-1230C can include inductors.

FIG. 12C shows two layers, a laminate layer 1210 and an LTCC layer 1220. In this embodiment, for example, the laminate layer 1210 can include large inductors and the LTCC layer 1220 can include capacitors and small inductors.

In alternative embodiments, the basic filter can be implemented using multiple fabrication technologies and optimized for filter shape and RF parameters using active components that can be tuned and adjusted under software control. For example, software can be used to configure and tune filter signal rejection, load impedance RL, signal termination, multiplexer or diplexer by-pass and common mode rejection and adaptation.

Figure 13:
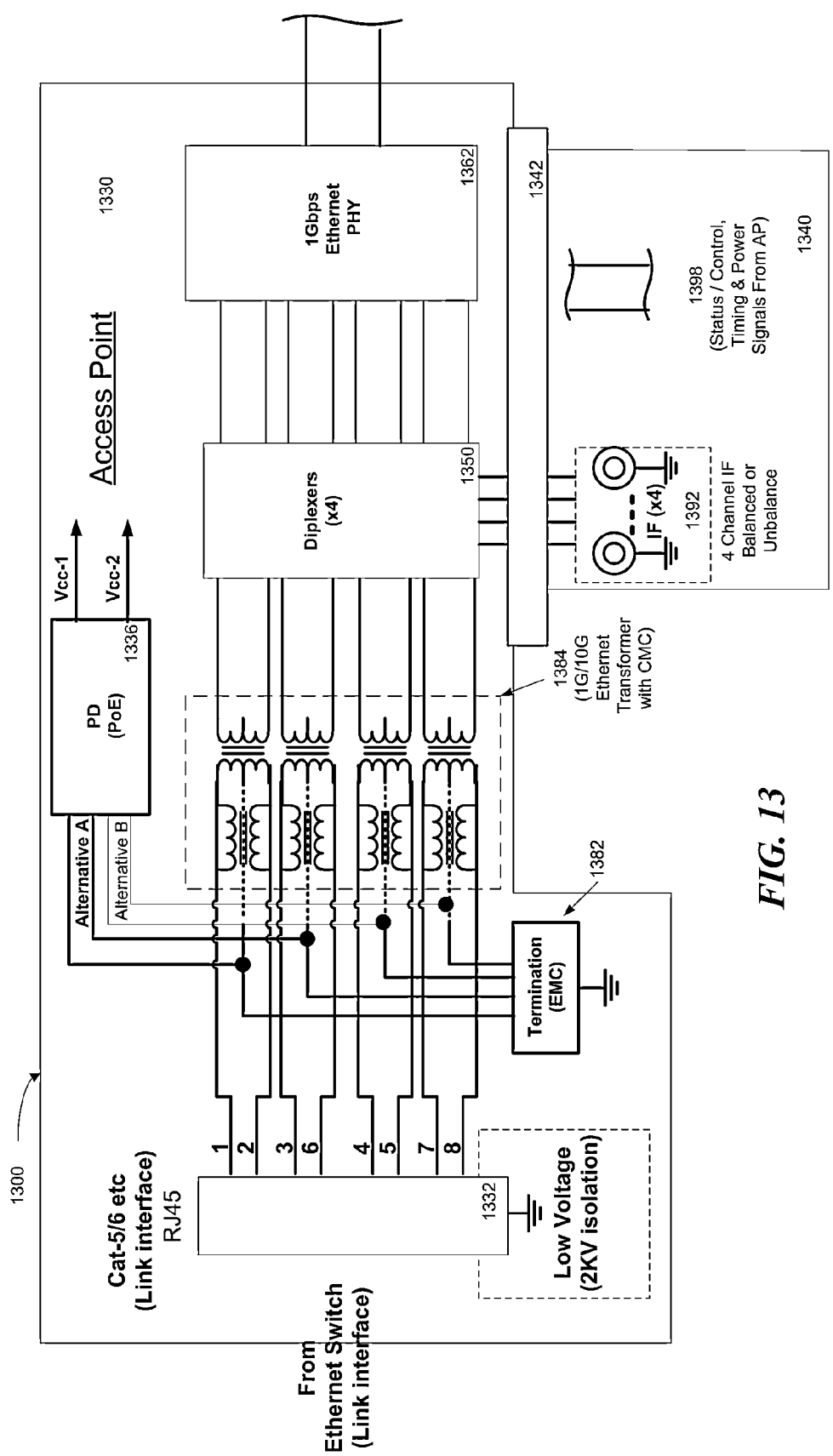
FIGS. 13 and 14 show alternative embodiments of the invention.

FIG. 13 shows an alternative embodiment of the invention, similar to the systems shown in FIGS. 2-4. FIG. 13 shows a network access point 1330 (although other network devices can be used) that can be connected to an RF module 1340) such as those shown in FIGS. 1-5 via an expansion connector 1342. In this embodiment, the access point (or network device) 1330 can include a 1 Gigabit or 10 Gigabit Ethernet transformer with a common mode choke 1384 connected between the RJ45 connector 1332 (that connects to the cable run) and the Diplexer 1350. The one or more power signals PD 1336 can be provide from the center taps of the Ethernet transformers 1384 as shown. The Diplexer 1350 can extract from and combine one or more IF signals 1392 on to each of the twisted pair of the cable run. Where the cable run, is CATS or better networking cable, the system 1300 can use each pair as separate physical channel that can carry one or more logical channels using frequency division multiplexing or diplexing (e.g. using different frequencies) or time division multiplexing or diplexing (e.g. using different time slots). In this embodiment, status, control, power and timing signals 1392 can be provided by the access point to RF module 1340 using the expansion connector 1342 to connect the controller (not shown) of the RF module 1340 with the controller and/or the DSP of the access point (not shown). The status, control, power and timing signals 1392 can be bidirectional or unidirectional signals that flow between the access point and the RF module. The communication protocols can include well known protocols such as RS-232 or proprietary protocols. In this embodiment, signal conditioning components, such as Ethernet transformers 1384 can be omitted between the Diplexer and the Ethernet PHY. In an alternative embodiment, the timing signal can be obtained from one of the signals extracted by the diplexer, using for example, one of the IF signals.

Figure 14:
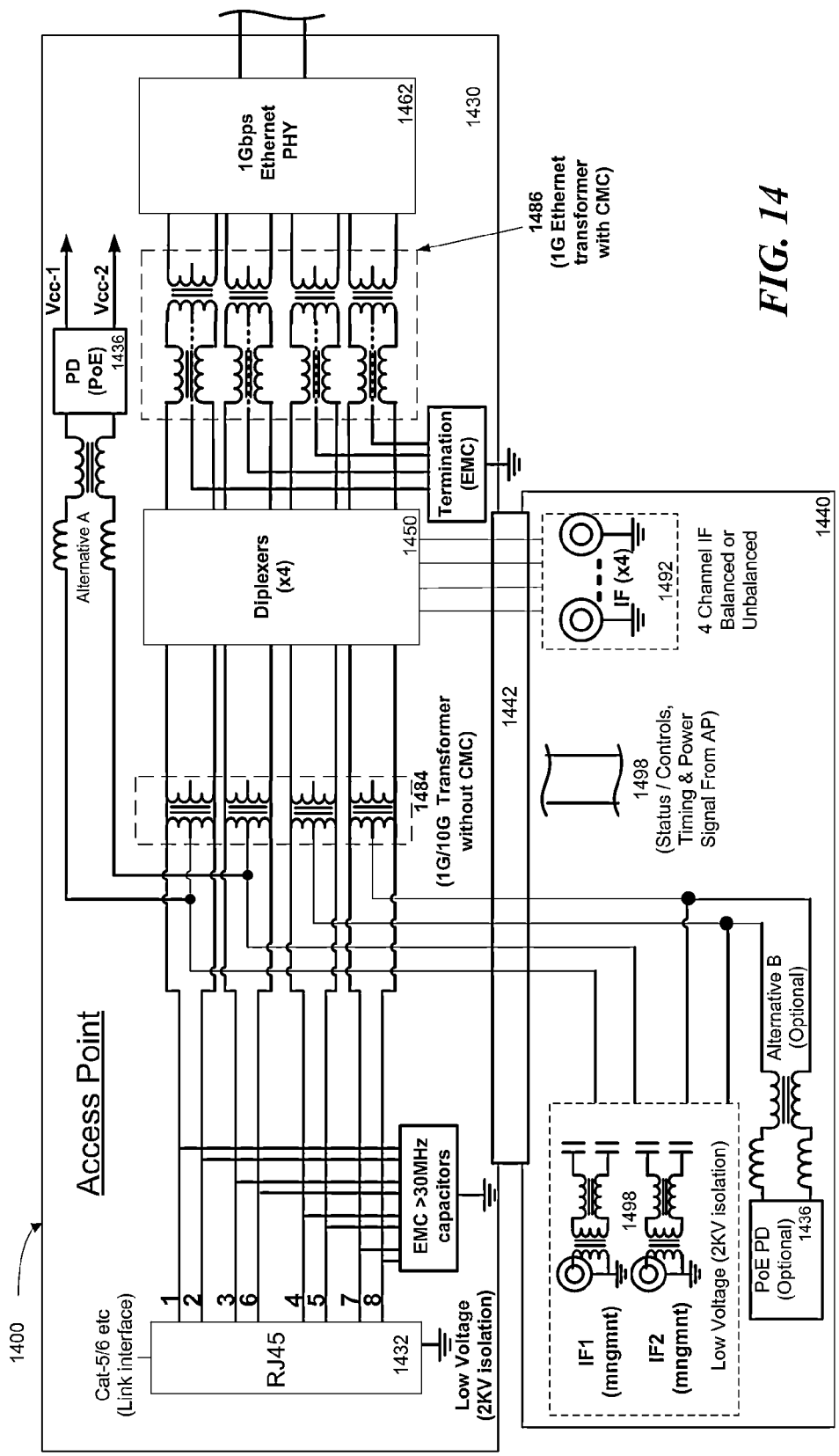

FIG. 14 shows an alternative embodiment of the invention, similar to the systems shown in FIGS. 2-4 and 13. FIG. 14 shows a network access point 1430 (although other network devices can be used) that can be connected to an RF module 1440 such as those shown in FIGS. 1-5 via an expansion connector 1442. In this embodiment, the access point (or network device) 1430 can include a 1 Gigabit or 10 Gigabit Ethernet transformer without a common mode choke 1484 connected between the RJ45 connector (that connects to the cable run) and the Diplexer 1450 and a 1 Gigabit Ethernet transformer with a common mode choke 1486 between the Diplexer 1450 and the Ethernet Physical Interface (PHY) 1462 to provide additional data signal conditioning. The power signal PD 1463 can be provided from the center taps of the Ethernet transformers 1484 as shown. The Diplexer 1450 can extract from and combine one or more IF signals on to each of the twisted pair of the cable run. Where the cable run, is CATS or better networking cable, the system 1400 can use each pair as separate physical channel that can carry one or more logical channels using frequency division multiplexing or diplexing (e.g. using different frequencies) or time division multiplexing or diplexing (e.g. using different time slots). In this embodiment, status, control, power and timing signals 1492 can be provided by differential signals carried by two of the twisted pair using an IF signal that can be extracted and combined using the Ethernet transformers without the common mode choke 1484. The status, control, power and timing signals 1492 can be bidirectional or unidirectional signals that flow between the Ethernet transformer 1484 and the RF module 1440. In an alternative embodiment, the timing signal can be obtained from one of the signals extracted by the Diplexer 1450, using for example, one of the IF signals. In this embodiment, the power signals can include transformers for additional filtering to provide a clean power signal. Additional passive components, for example, EMC capacitors, can be connected between the RJ 45 connector (connected to the cable run) and Ethernet transformers to provide additional signal conditioning.

In accordance with alternative embodiments of the invention, the phantom connection can also be terminated by common mode chock transformer to suppress the unwanted emissions and interference from the additional signals coming into the Ethernet device on both the differential twisted pair connection and the phantom connection. Further, the diplexer block can include two or more additional diplexers to allow for expansion and support future changes, such as Ethernet spectrum changes. Alternatively, the diplexers can include configurable active filters to support future changes in frequency band allocation. The active filters can be configurable based on rejection needed on a per application basis and provide for configurable signal loss. For example, the rejection requirement can be different when the IF signal is sharing the cable with an Ethernet signal than when the IF signals are on an adjacent cable.

Figure 15:
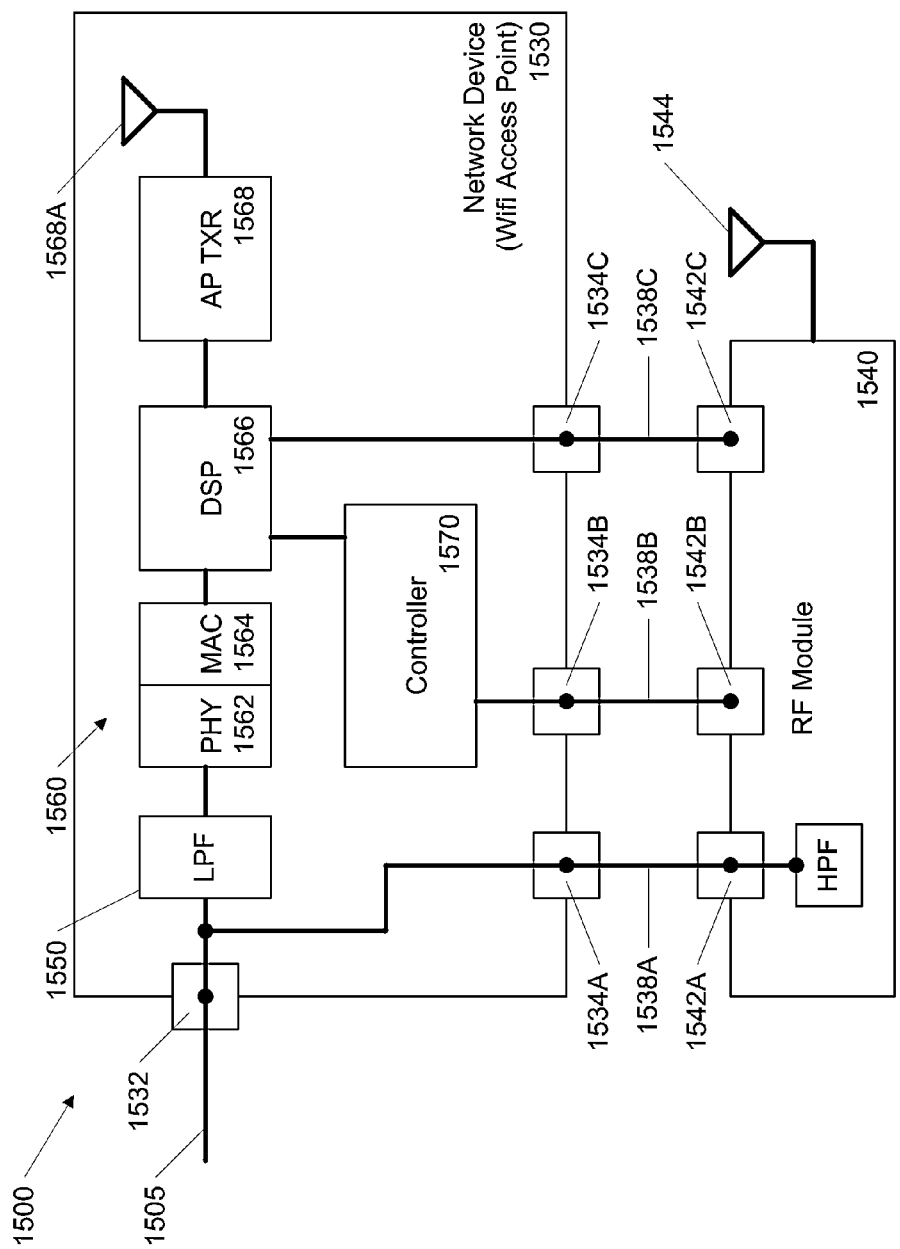
FIG. 15 is a block diagram of an access point and an RF module according to an alternate embodiment of the invention shown in FIG. 1.
Figure 16:
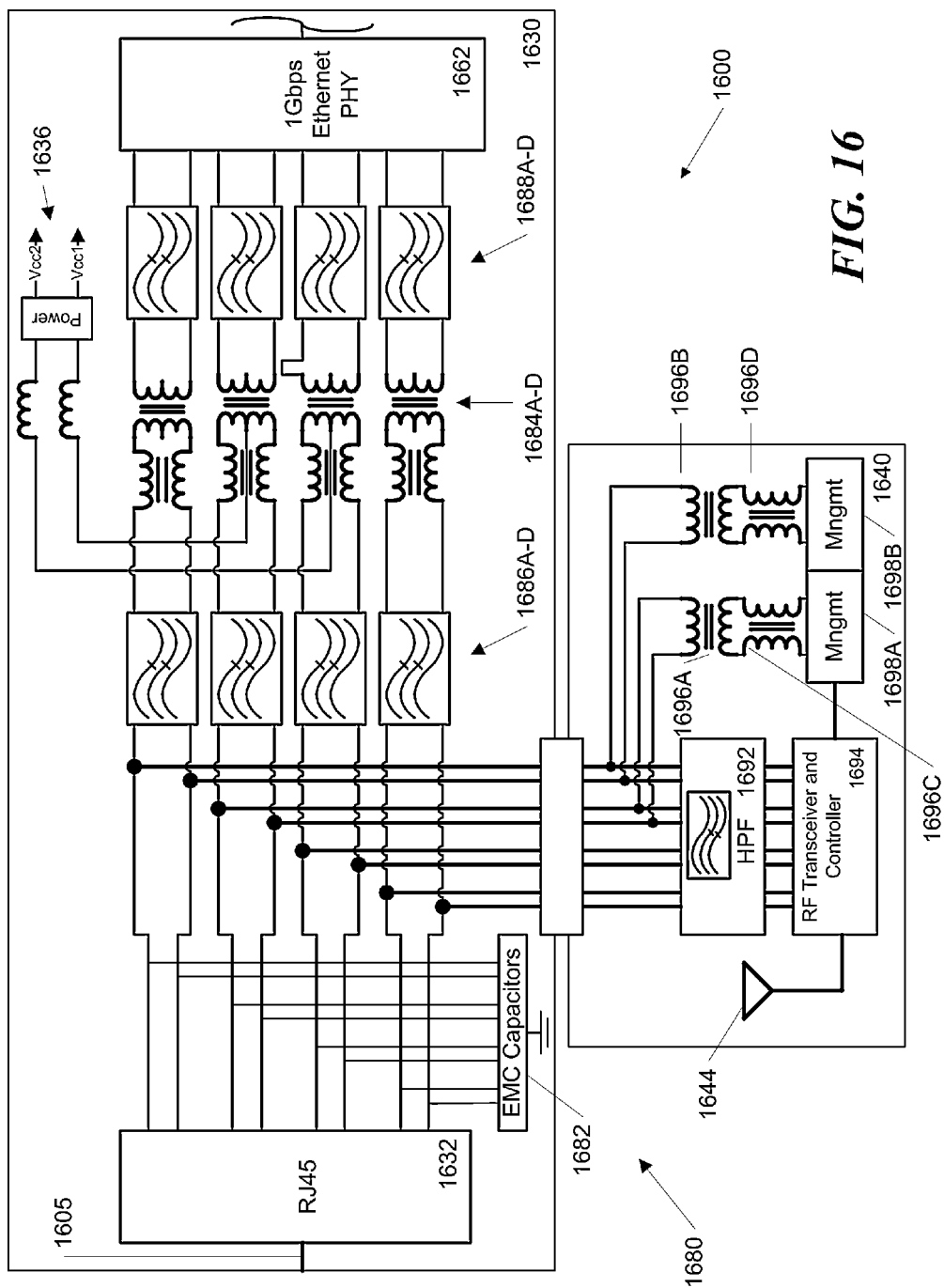
FIG. 16 is a diagrammatic view of the combination of an Ethernet device and an RF module according to an alternate embodiment of the invention.
Figure 17:
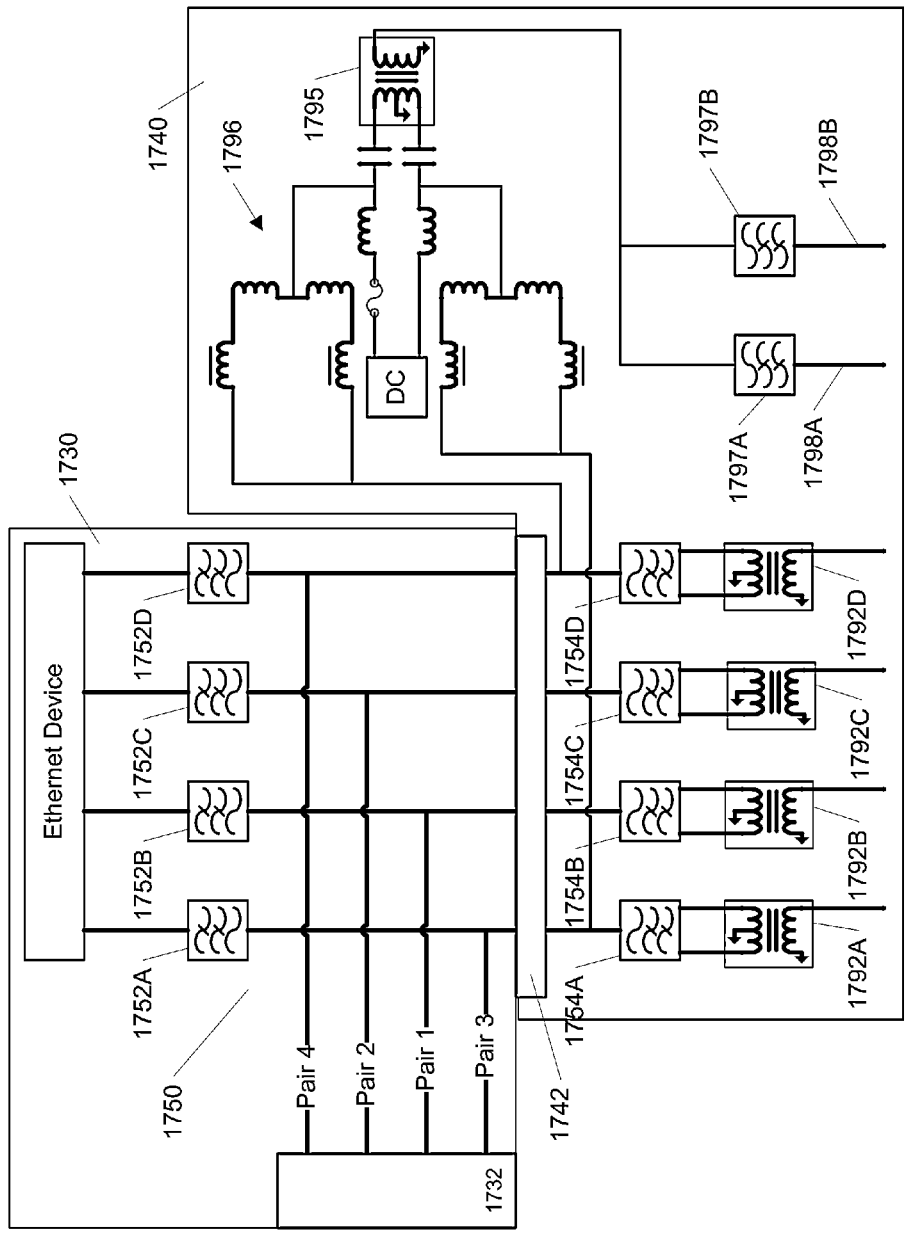
FIG. 17 is a diagrammatic view of an Ethernet device and a connected device according to an alternate embodiment of the invention.

In an alternative embodiment of the invention, the multiplexer or diplexer components can be distributed between the network access point (or network device) and the RF module. For example, network access point can include a first (or pre) low pass filter (LPF) between the network connection and the Ethernet transformer and the RF module connection can tap the link wire connecting the network connection to the LPF. A high pass filter (HPF) can be provided on the RF module between the tap and the RF module transceiver. Mating connectors on the access point and the RF module can be used to enable the RF module to be removable. FIGS. 15-17 show a system according to this embodiment of the invention.

FIG. 15 shows a system 1500, similar to system 200 shown in FIG. 2, according to an alternative embodiment of the invention.

FIG. 15 shows a network access point 1530 and an RF module 1540 in accordance with the alternative embodiment of the invention. The network access point 1530 can include a connector 1532, a low pass filter 1550 (forming part of a distributed multiplexer), a physical layer interface (PHY) 1562, a media access controller (MAC) 1564. a signal processor (DSP) 1566, and an access point wireless transceiver (AP TXP) 1568 providing IQ to RF conversion. The connector 1532 can be, for example an RJ45 connector that mates an appropriate connector on the end of the cable run 1505. In accordance with the invention, the network access point 1530 can include a component or group of components, including LPF 1550 and HPF 1545 to form a multiplexer that can separate the digital data signals and the IF signals received from the cable run 1505 and combine the digital data signals and IF signals for transmission over the cable run 1505. In accordance with one embodiment of the invention, the multiplexer can be formed from one or more LPFs and HPFs, including one for each signal wire or wire pair (up to 4 or more) in the system. In addition, the network access point 1530 can include well known digital data network interface and processing components 1560 (including elements 1562 and 1564) adapted to receive/send and process the digital data network signals. For example, in one embodiment, the network access point 1530 can be a wireless Ethernet (WiFi) access point. The access point 1530 can include an Ethernet transformer with or without a common mode choke (shown in FIGS. 3, 4, 13, 14, 16, 17), an Ethernet physical layer interface (PHY 1562), an Ethernet media access controller (MAC 1564), a signal processor (DSP 1566), and an access point wireless transceiver (converting between IQ signals and RF signals) 1568 and one or more antenna(s) 1568A for transmitting and receiving wireless digital data according to proprietary or well known standards such as IEEE 802.11 or WiFi. The DSP 1566 can be connected directly using a connection 1534C, a link 1538C, and a connection 1542C or indirectly, thru the controller 1570, via connection 1534B to the RF module 1540, for example, using a bi-directional analog or digital link 1538C. The link 1538C can support additional functionality, for example, RF module listening mode, Pilot beacon mode for location and signaling to the handset of operational frequencies. Narrow band RF samples can be extracted from the IP traffic to provide additional narrow band services, for example, IDEN, two way radio, medical telemetry, and a PILOT control signal that can be used in macro networks.

The network access point 1530 can also include a controller 1570 for controlling the operation of the network access point 1530 and any or all the components 1560 of the network access point 1530. In addition, the controller 1570 can communicate with and, optionally, control some or all the operations of the RF module 1540 using communication channel 1538B or 1538C. The RF module 1540 can include a connector 1542 for connecting with connector 1534 of the network access point 1530 and communication channels 1538 to transfer data between the network access point 1530 and the RF module 1540. For illustrative purposes, FIG. 15 shows three separate sets of connectors (1534A-1534C and 1542A-1542C) and communication channels 1538A-1538C), however a single, multi-conductor connector can be used. The network access point 1530 can be any network device and does not need to be an access point. In other embodiments of the invention, a network device, such as a hub, switch or router, or a computer terminal or network attached printer can be substituted for network access point 1530.

In one embodiment, the RF module 1540 can include a component that includes or generates one or more access keys that can be used control the use of the RF module 1540 and the RF based services provided by the RF module 1540. The access point 1530 can communicate with the RF module 1540 to request one or more access keys from the component in RF module 1540. The access point 1530 can validate the access key(s) to verify that the RF module is compatible with the access point 1530 as well determine which services (e.g., cellular, pcs, 3G, etc.) are authorized to be used on the access point 1540. For example, an access point 1530 can be authorized for use with only a 3G network, even though the RF module can support additional services, such as cellular and pcs. In addition, the access point 1530, in some embodiments can be powered by power supplied by a connected switch or control unit and can measure the available power from the switch or control unit and limit the levels of service authorized based on the available power received at the access point.

In accordance with invention, the RF module 1540 can optionally include noise suppression circuitry, frequency conversion components and a transceiver. The noise suppression circuits can be used to suppress cross-talk, low frequency noise and common mode noise. The frequency conversion components, can include for example, mixers that convert, on the downlink, the IF signals back to RF signals to be transmitted by the transceiver through the antenna to the wireless devices and convert on the uplink, the RF signals received by the transceiver through the antenna to IF signals for transmission to the base station.

In accordance with the invention, the RF module 1540 can include active and/or passive noise suppression circuitry. In accordance with one embodiment of the invention, on the downlink, the control unit can receive from the access point, either a command signal or a noise cancelation signal determined from the noise measured by the access point and, using a fixed or variable gain, combine the noise cancellation signal with the downlink signal to suppress noise. Similarly, on the uplink, the control unit can receive from the access point, either a command signal or a noise cancelation signal determined from the noise measured by the access point and, using a fixed or variable gain, combine the noise cancellation signal with the uplink signal to suppress noise. In some embodiments, the source of the noise will primarily be from cross-talk between cables carrying different services. In accordance with on embodiment, the control unit can communicate with an adjacent control unit to obtain the noise signal and communicate with the access point to determine the appropriate level of gain or attenuation needed to suppress the noise separately on both the uplink and the downlink.

The network access point 1530 can include a controller 1570, such as a microprocessor and associated memory (including volatile and non-volatile). The memory can include software or firmware that programs and instructions that define the operation of the network access point 1530. The programs and instructions and the operation of the network access point 1530 can be user configurable. The network access point controller 1570 can communicate with an RF module controller (not shown) via communication channel 1538 to enable the network access point controller 1570 monitor and/or control the RF module 1540. Alternatively, the RF module controller can control the network access point 1530.

FIG. 16 shows an alternate embodiment of the invention similar to FIGS. 3 and 4. In accordance with the alternate embodiment of the invention, multiplexer or diplexer is distributed between the access point 1630 and the RF module 1640. As shown in FIG. 16, the network access point 1630 is connected to the cable run 1605 of the network by network connector 1632. The access point 1630 can include a first low pass filter (LPF) 1688A-D connected on each wire (or wire pair) between the Ethernet transformers 1684A-D and the network interface 1662. The access point 1630 can also include an optional second low pass filter (LPF, or pre-LPF) 1686A-D on each wire (or wire pair) connected between the network connector 1632 and the Ethernet transformers 1684A-D to further reduce high frequency noise in the system.

The access point 1630 can also include an expansion connector 1642 for connecting an RF module 1640 to the access point 1630. The expansion connector 1642 can be connected to tap into each wire before the first LPF 1686A-D (between the expansion connector 1642 and the first LPF 1686A-D). In the RF module, a high pass filter (HPF) 1692 can be connected on each wire coming from the expansion connector 1642 that connects the IF signals to RF transceiver 1694. Together, the first LPF 1686 and the HPF 1692 form a multiplexer or diplexer as shown in FIGS. 5 and 17. The RF module 1640 can include a controller and transceiver unit 1694 for controlling the operation of the RF module 1640. In some embodiments of the invention, the control portion of the control and transceiver unit 1694 can be omitted. In operation, signals received from the network can be up-converted (from IF to RF) and transmitted using antenna 1644 and RF signals received by antenna 1644 can be down-converted (from RF to IF) and transmitted to the network. The controller and transceiver unit 1694 can include an up-down converter for converting the IF signals to RF signals on the downlink and the RF signals to IF signals on the uplink.

The Diplexer 350 can split the signals on each wire pair received by access point 330, feeding the IF signals to the RF module 340. The RF module 340 can include a control and transceiver unit 394 for controlling the operation of the RF module 340 and transmitting and receiving RF signals. In some embodiments of the invention, the control portion of the control and transceiver unit 394 can be omitted. In operation, signals received from the network can be up-converted (from IF to RF) and transmitted using antenna 344 and RF signals received by antenna 344 can be down-converted (from RF to IF) and transmitted to the network. The control and transceiver unit 394 can also include an up-down converter for converting the IF signals to RF signals on the downlink and the RF signals to IF signals on the uplink.

FIG. 17 shows an alternate embodiment of the invention similar to FIG. 5. In accordance with the alternate embodiment of the invention, the multiplexer or diplexer is distributed between the access point 1730 and the RF module 1740.

FIG. 17 shows a diagram of the alternate embodiment of the invention showing each of the multiplexer or diplexer constructed using a low pass filter 1752A-D in the network access point 1730 and a high pass filter 1754A-D in the RF module 1740. In this embodiment, the RF module 1740 can be connected to the network access point 1730 through connector 1742. As shown in FIG. 17, optional baluns 1792A-D can be provided to convert the balanced/differential signals received from the multiplexer or diplexer to unbalanced signals. The baluns 1792A-D can be omitted to provide improved differential isolation and improved isolation between unshielded cables to support multiple IF bands on the same physical twisted pair cable, such as to support 4 channel MIMO technology. In accordance with this embodiment, multiple RF signals can be carried on the same IF band using TDD and/or multiple IF bands using FDD. In an alternative embodiment, active common mode noise suppressing circuits can be used to improve common mode noise rejection and improve performance of the system.

FIG. 17 also shows a system for providing management signals 1798A and 1798B using differential signaling between 2 pair of twisted pair cables (Pair 3 and Pair 4). In this embodiment, an inductor network 1796 which can include, for example, ferrite bead inductors capacitively coupled to balun 1795 to suppress the high frequency noise and pass the low frequency (0-30 MHz) management signals. Filters 1797A and 1797B can be used extract the specific management signal frequency. Filters 1797A and 1797B can be high pass filters, band pass filters and low pass filters, depending on the signal frequencies used for the management signals. In one embodiment, the management signals can be transferred on the 5.5 MHz and 10 MHz frequency bands.

In an alternative embodiment, the RF module 140-1740 can, instead of including an RF transceiver, be configured with only an RF transmitter or only RF receiver to accommodate RF services that broadcast only or receive only. Further, the RF module can support more than one RF service, using the same or different conductors in the network cable run to backhaul each RF service IF signal to the access point. Thus, the RF module can include at least a transmitter or a receiver for each service supported, for example a receiver for one service, a transmitter for another service and a transceiver for a third service as well as other combinations of transmitters, receivers and transceivers.

In an alternative embodiment, the multiplexer or diplexer can be adaptive and configurable to compensate for common mode noise in order to improve interference rejection on an installation by installation basis. The compensation can be done to compensate for any deficiencies in the cable or the filter implementation once in production, during installation or any time by injecting a reference signal into the Ethernet device or RF module circuitry. This capability can be integrated in the RF module or on the multiplexer or diplexer itself. Improved common-mode noise rejection can be used to increase the effective BW for MIMO signals. Without this capability, the isolation between twisted pairs, especially at high frequency (>150 MHz) may not be sufficient to support the use of the same frequency by MIMO technologies or different cellular signals. In one embodiment, each twisted pair can use a different IF band to carry a separate MIMO channel allowing 4 MIMO channels. In an alternate embodiment, each twisted pair can use the same IF band to carry a separate MIMO channel. The use of the same IF (including using TDD), can save BW and simplify the design and implementation of a MIMO based RF module, for example by using a single synthesizer for multiple channels. In an alternate embodiment, each twisted pair can carry more than one IF band, using TDD or FDD, and provide support for more than 4 MIMO channels. For example, each twisted pair can carry 4 IF channels (using either TDD or FDD) and provide support for a total of 4×4 MIMO channels.

The multiplexer or diplexer can be designed to provide the following capabilities when the RF module is not connected to the system. The multiplexer or diplexer can be designed to reduce reflection by providing sufficient load impedance RL to the LPF section. Alternatively, the RF module connection can include RF termination to improve load impedance and reduce signal reflection when the RF module is not connected. Alternatively, the multiplexer or diplexer can include a LPF by-pass to reduce the Ethernet signal degradation. Alternatively, the LPF can be actively configured to reduce rejection to ease the degradation in Ethernet margins, including when a by-pass switch is used (FIG. 7) and when active components are used.

In accordance with the invention, the RF module can include multiple parallel and/or multiple serial connections to the Ethernet device. These connections can provide for local management for controlling and monitoring the operation of the RF module, such as by well known communication techniques, for example, SPI, I2C and UART.

In addition, a real time digital interface from the Ethernet device DSP to the RF module can be provided to support advanced self configuration capability, for example, listening mode (to listen to the other Base station environment in the downlink) frequencies collecting information that can be use for hand over), transmit PILOT beacons mode to signal the users on the required operational frequency of the DAS system and location information etc).

The connection can include a unit identification function, such as by a separately powered identification key that allows the power to be turn on to the RF module only after the identification key has been verified. Alternatively, the connection can use an activation based system that allows the Ethernet device to identify the RF module and determine whether to provide power to it. The connection can include real time signaling, for example, TDD, reference clock and sync signals. The connection can include, power, such as non-regulated power provided through Power over Ethernet, semi-regulated 12V and regulated 5 and/or 3/3 V.

In an alternative embodiment, the diplexer block 350, 450, 550 and filters 1550, 1545, 1686A-D, 1692, 1752A-D and 1754A-D can include active filters or active filter components that allow the system to change IF signal frequencies and configure noise rejection based on the application.

In a further embodiment, the system can use magnetic coupling to inject and extract the IF signal at one or both ends of the cable run 105, 205, 305, 405.

Other embodiments are within the scope and spirit of the invention. For example, due to the nature of software, functions described above can be implemented using software, hardware, firmware, hardwiring, or combinations of any of these. Features implementing functions may also be physically located at various positions, including being distributed such that portions of functions are implemented at different physical locations.

Further, while the description above refers to the invention, the description may include more than one invention.

What is claimed is:

1. A system for transferring network data and RF based services over a common facility, the system comprising:
    an RF base station and a network switch connected to a control unit;
    one or more cable runs, each cable run connecting the control unit to a network access point;
    at least one network access point including an RF module for providing RF based services, the network access point including a low pass filter and a high pass filter for separating network signals and intermediate frequency (IF) signals on the downlink and combining network signals and IF signals on the uplink, wherein the RF module can be disconnected from the network access point;
    wherein the control unit includes an up-down converter for converting each RF signal associated with RF based service to an IF and transmitting the IF signal over the cable run to the network access point and for converting IF signals received over the cable run from the network access point to RF signals; and
    the RF module includes an up-down converter for converting each RF signal associated with RF based service to an IF and transmitting the IF signal over the cable run to the control unit and for converting IF signals received over the cable run from the control unit to RF signals.

2. A system according to claim 1 further comprising a connector, connecting the RF module to the network access point and enabling the RF module to be disconnected from the network access point.

3. A system according to claim 1 wherein at least one cable run includes 4 pair of wires and each pair of wires carries network data signals and at least one RF based service signal at an IF.

4. A system for transferring network data and RF based services over a common facility, the system comprising:
    a network device configured to:
        couple to one or more cable runs and receive from the one or more cable runs downlink digital signals complying with an Ethernet protocol;
        wirelessly transmit the downlink digital signals in a radio frequency spectrum;
        wirelessly receive uplink digital signals in the radio frequency spectrum; and
        send the uplink digital signals over the one or more cable runs as digital signals complying with the Ethernet protocol;
    a RF module configured to:
        couple to the one or more cable runs and receive from the one or more cable runs downlink intermediate frequency signals;
        convert the downlink intermediate frequency signals to downlink RF signals;
        wirelessly transmit the downlink RF signals in the radio frequency spectrum;
        wirelessly receive uplink RF signals in the radio frequency spectrum; and
        send the uplink RF signals over the one or more cable runs as uplink intermediate frequency signals; and
    an interconnection between the network device and the RF module for providing management signals between the network device and the RF module.

5. The system of claim 4, wherein the interconnection comprises multiple parallel connections.

6. The system of claim 4, wherein the interconnection comprises multiple serial connections.

7. The system of claim 4, wherein the management signals provide local management for controlling and monitoring operation of the RF module.

8. The system of claim 4, wherein the interconnection comprises a digital interface.

9. The system of claim 8, wherein the digital interface is configured to support advanced self-configuration capability.

10. The system of claim 4, wherein the RF module comprises noise suppression circuitry configured to suppress one or more of items selected from the group consisting of: crosstalk, low frequency noise, and common mode noise.

11. The system of claim 4, wherein the RF module comprises a component configured to generate one or more access keys that can be used to control the use of the RF module.

12. The system of claim 11, wherein the network device is configured to request one or more access keys from the component in the RF module.

13. The system of claim 4, further comprising the one or more cable runs.

14. The system of claim 13, wherein each of the one or more cable runs comprises four pairs of conductors, and each pair of conductors is configured to carry a different intermediate frequency band.

15. The system of claim 4, wherein the network device comprises a multiplexer configured to compensate for common mode noise.

* * * * *